(12) United States Patent
Dobashi et al.

(10) Patent No.: US 10,038,820 B2
(45) Date of Patent: Jul. 31, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Toshiyuki Dobashi, Tokyo (JP); Shoei Moribe, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/490,617

(22) Filed: Apr. 18, 2017

(65) Prior Publication Data

US 2017/0310851 A1    Oct. 26, 2017

(30) Foreign Application Priority Data

Apr. 25, 2016  (JP) .................................. 2016-087442

(51) Int. Cl.
*H04N 1/405* (2006.01)
*H04N 1/52* (2006.01)
*H04N 1/60* (2006.01)

(52) U.S. Cl.
CPC ............. *H04N 1/4051* (2013.01); *H04N 1/52* (2013.01); *H04N 1/6008* (2013.01)

(58) Field of Classification Search
CPC .......... H04N 1/4051; H04N 1/52; H04N 1/58; H04N 1/6008
See application file for complete search history.

(56) References Cited

FOREIGN PATENT DOCUMENTS

JP    2003-153865 A    5/2003

*Primary Examiner* — Christopher D Wait
(74) *Attorney, Agent, or Firm* — Canon, U.S.A., Inc. IP Division

(57) ABSTRACT

Sharpness of image data in a low-frequency component, which is deceased by an image forming apparatus, is recovered and the recovered image data is converted into halftone image data. Halftone processing includes calculating edge intensity in a local region, dividing the local region into a first pixel group and a second pixel group based on a pixel value of each pixel, determining a distribution order of dots based on a pixel value of each pixel, a threshold value, and the edge intensity such that dots are likely to be distributed to the first pixel group and dots are unlikely to be distributed to the second pixel group, and determining an output value for each pixel in the local region by distributing dots to some pixels included in the local region as much as a number of dots to be output to the local region while referring to the distribution order.

10 Claims, 21 Drawing Sheets

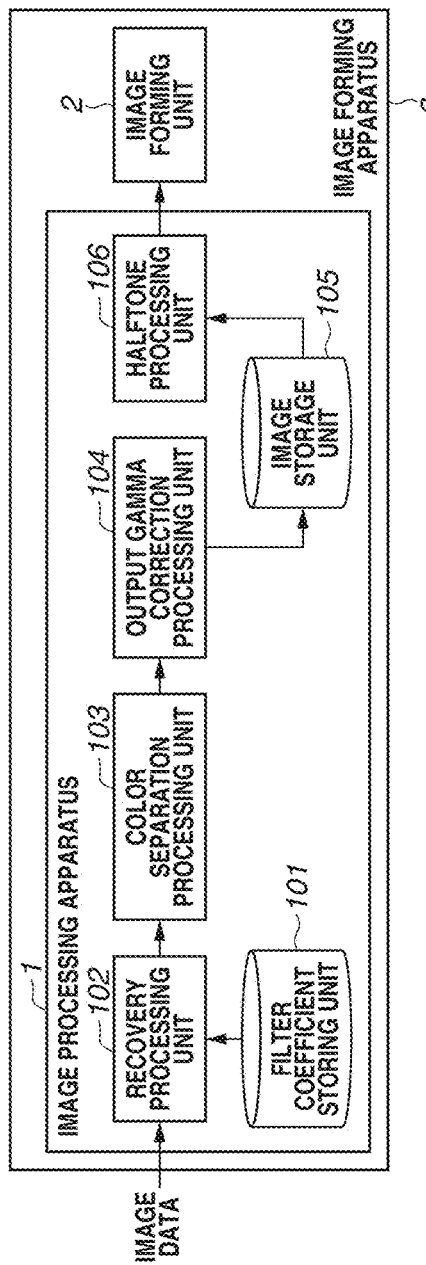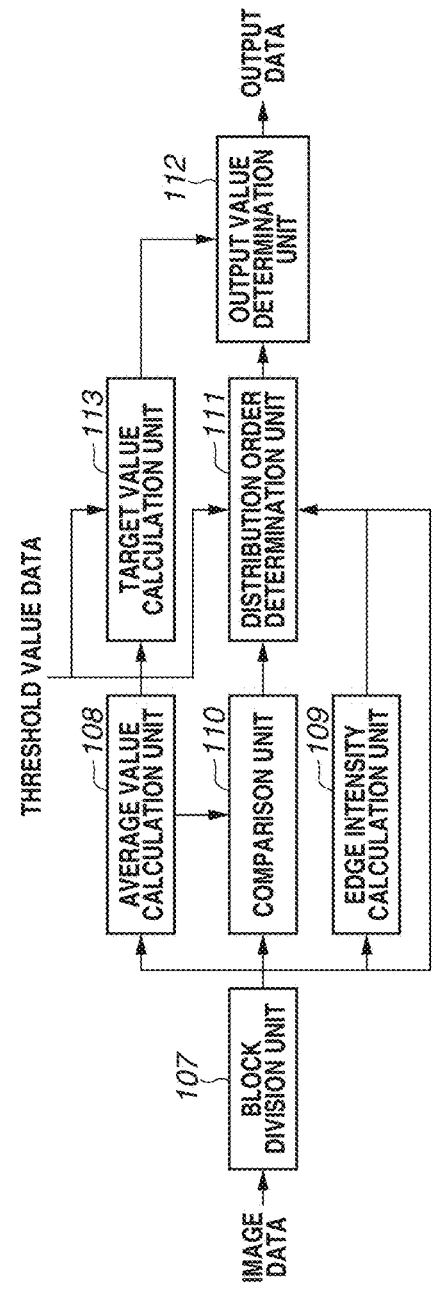

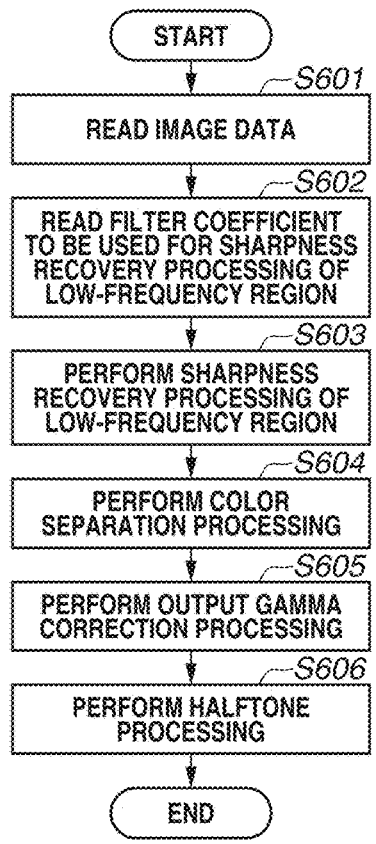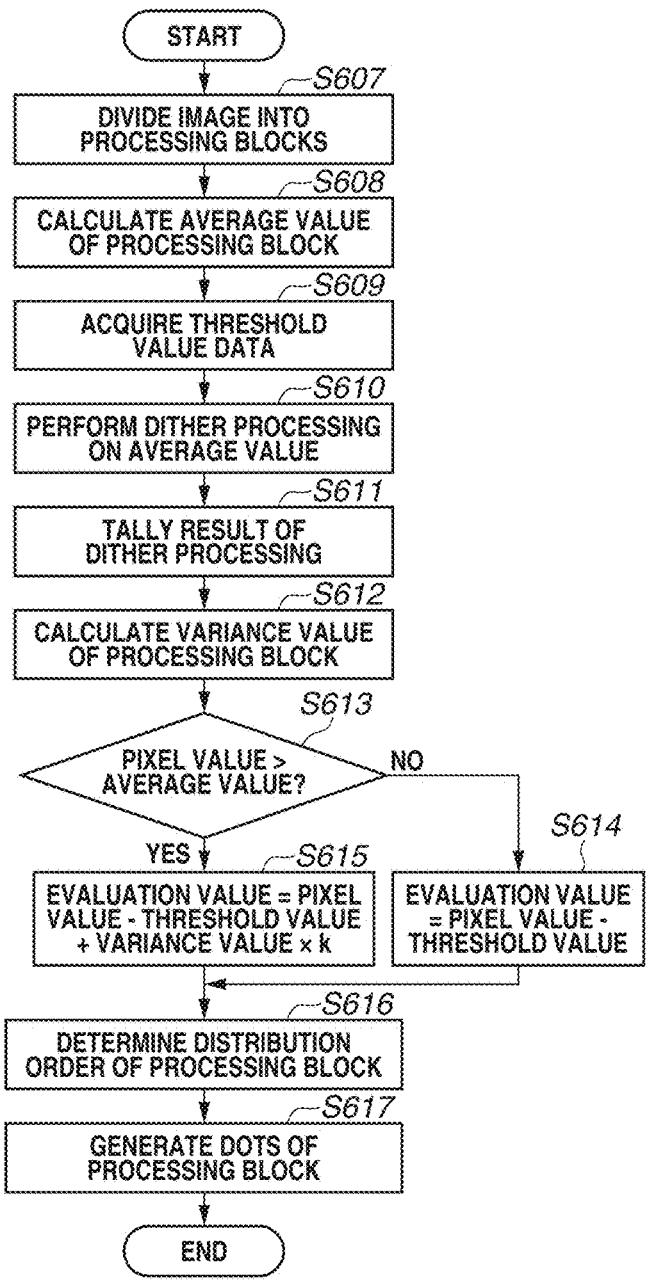
FIG.6A / FIG.6B

FIG.8A

| 165 | 90  | 225 | 77  | 169 | 29  | 135 | 101 | 76  | 161 |     |
|-----|-----|-----|-----|-----|-----|-----|-----|-----|-----|-----|
| 16  | 190 | 127 | 223 | 187 | 245 | 206 | 53  |     |     |     |
| 230 | 93  | 50  | 172 | 142 | 113 |     |     |     |     |     |
| 99  | 215 | 64  | 239 | 158 | 213 | 230 | 126 |     |     |     |
| 0   | 151 | 112 | 88  | 60  | 179 | 35  | 189 |     |     |     |
| 96  | 63  | 226 | 192 | 254 | 145 | 117 | 240 |     |     |     |
| 126 | 183 | 160 | 133 | 14  | 205 | 224 | 97  |     |     |     |
| 16  | 212 | 51  | 236 | 106 | 169 | 71  | 151 |     |     |     |
| 186 | 242 | 85  | 197 | 220 |     |     |     |     |     |     |
| 143 | 116 | 170 | 150 |     |     |     |     |     |     |     |
| 97  | 215 | 36  | 249 |     |     |     |     |     |     |     |
| 206 | 230 | 72  | 203 |     |     |     |     |     |     |     |
| 80  | 137 |     |     |     |     |     |     |     |     |     |
| 164 |     |     |     |     |     |     |     |     |     |     |

256 PIXELS (horizontal) × 256 PIXELS (vertical)

804 — AVERAGE VALUE: 128

801 — THRESHOLD VALUE GROUP:
| 165 | 90  | 225 | 77  | 215 |
|-----|-----|-----|-----|-----|
| 16  | 190 | 127 | 169 | 64  |
| 230 | 93  | 223 | 29  | 239 |

806 — QUANTIZATION RESULT (checkerboard pattern)

FIG.9
| 1101 | 27 | -26 | -33 | -35 |
|---|---|---|---|---|
| | 176 | -126 | 115 | -151 |
| | -38 | -63 | 23 | 0 |
| | 99 | -159 | 163 | -175 |
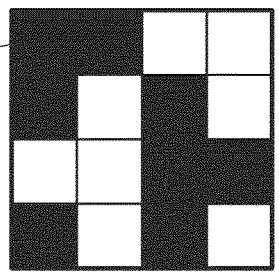
1102
| 1103 | 47 | -26 | -13 | -35 |
|---|---|---|---|---|
| | 196 | -126 | 135 | -151 |
| | -18 | -63 | 43 | 0 |
| | 119 | -159 | 183 | -175 |
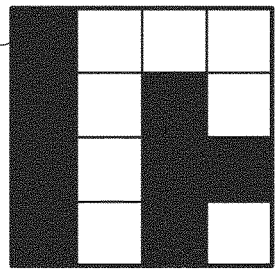
1104
| 1105 | 68 | -26 | 8 | -35 |
|---|---|---|---|---|
| | 217 | -126 | 156 | -151 |
| | 3 | -63 | 64 | 0 |
| | 140 | -159 | 204 | -175 |
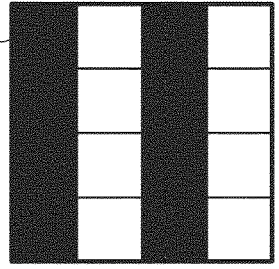
1106

IMAGE PROCESSING APPARATUS, IMAGE PROCESSING METHOD, AND STORAGE MEDIUM

BACKGROUND

Field of the Disclosure

Aspects of the present disclosure generally relate to image processing and, more particularly, to an image processing apparatus, an image processing method, a storage medium, and to an image processing technique to convert input image data into image data that is able to be recorded by a recording apparatus.

Description of the Related Art

It is known that an image output from an image forming apparatus such as an inkjet printer decreases in sharpness as compared with an input image due to, for example, an impact position deviation of ink, the spread of ink (mechanical dot gain), or optical blurring (optical dot gain). Hence, Japanese Patent Application Laid-Open No. 2003-153865 discusses a method of previously acquiring the frequency characteristic of an output image and performing frequency enhancement processing on an input image using a filter having a characteristic inverse to the acquired frequency characteristic.

However, when frequency enhancement processing is performed on an input image with the use of the method discussed in Japanese Patent Application Laid-Open No. 2003-153865 and, for example, an image forming apparatus of the inkjet system forms an image on a recording medium, the brightness may decrease in a high-frequency region.

SUMMARY

One or more aspects of the present disclosure generally relate to generating image data in which a decrease in sharpness is compensated for with respect to an input image and, at the same time, the brightness is prevented from decreasing in a high-frequency region.

According to one or more aspects of the present disclosure, an image processing apparatus for generating halftone image data that is usable by an image forming apparatus which forms an image on a recording medium includes a recovery processing unit configured to perform, on input image data, recovery processing for recovering sharpness of a frequency component lower than a predetermined frequency in image sharpness that is deceased by the image forming apparatus, and a halftone processing unit configured to convert the image data subjected to the recovery processing by the recovery processing unit into halftone image data with a number of gradation levels which is able to be output by the image forming apparatus, wherein the halftone processing unit includes a target value calculation unit configured to calculate, as a target value, a number of dots that are to be output for each local region of the image data subjected to the recovery processing, an acquisition unit configured to acquire threshold values corresponding to the local region, an edge intensity calculation unit configured to calculate edge intensity in the local region, a division unit configured to divide pixels included in the local region into a first pixel group and a second pixel group based on a pixel value of each pixel, a distribution order determination unit configured to calculate, with respect to each pixel included in the local region, an evaluation value of each pixel based on a pixel value of each pixel, a threshold value corresponding to each pixel, and the edge intensity and to determine a distribution order, in which dots are to be distributed, based on an order of the evaluation value, and an output value determination unit configured to determine an output value for each pixel in the local region by distributing dots to pixels included in the local region as much as the target value while referring to the distribution order, and wherein the distribution order determination unit calculates the evaluation value in such a way that dots are likely to be distributed to the first pixel group and dots are unlikely to be distributed to the second pixel group.

Further features of the present disclosure will become apparent from the following description of exemplary embodiments with reference to the attached drawings.

BRIEF DESCRIPTION OF THE DRAWINGS

FIGS. 1A and 1B are block diagrams illustrating a configuration of an image forming apparatus according to one or more aspects of the present disclosure.

FIGS. 6A and 6B are flowcharts illustrating the flow of the entire processing performed by an image processing apparatus and the flow of processing in halftone processing, respectively, according to one or more aspects of the present disclosure.

FIGS. 8A and 8B illustrate an example of a threshold value matrix according to one or more aspects of the present disclosure.

FIG. 9 illustrates a processing result obtained by a halftone processing unit according to one or more aspects of the present disclosure.

FIGS. 18A and 18B illustrate a method for division into blocks according to one or more aspects of the present disclosure.

FIGS. 21A and 21B illustrate a method for division into blocks according to one or more aspects of the present disclosure.

DESCRIPTION OF THE EMBODIMENTS

Figure 2A:
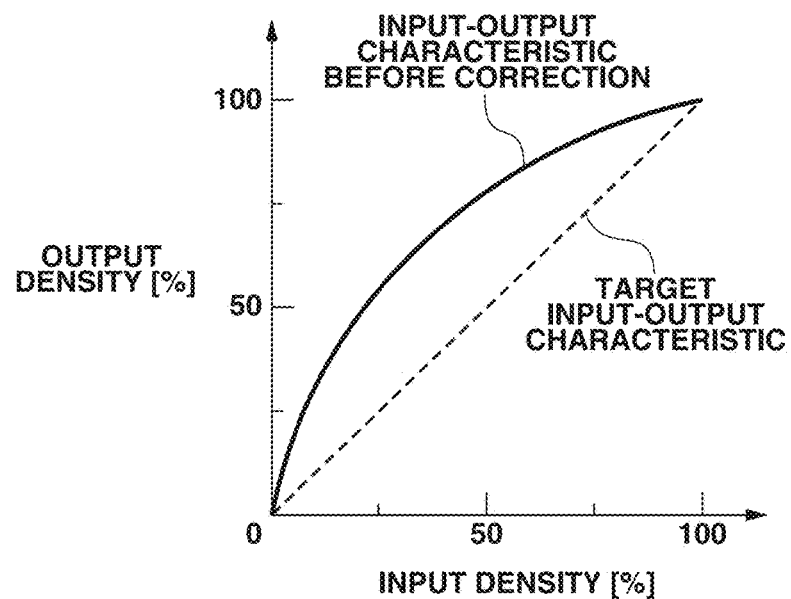
FIGS. 2A and 2B illustrate a gamma correction characteristic according to one or more aspects of the present disclosure.

Various exemplary embodiments, features, and aspects of the disclosure will be described in detail below with reference to the drawings. Furthermore, the following exemplary embodiments are not intended to limit the present disclosure, and not all of the combinations of features described in the exemplary embodiments are necessary to resolve issues in the present disclosure.

FIG. 1A is a block diagram illustrating a configuration of an image forming apparatus 3 which is applicable to a first exemplary embodiment. In the present exemplary embodiment, for example, a printer of the inkjet system is used as the image forming apparatus 3. An image processing apparatus 1 generates, from input image data, print data that is able to be output by an image forming unit 2. The image processing apparatus 1 is incorporated in the image forming apparatus 3 as a dedicated image processing circuit to the image forming apparatus 3. The image processing apparatus 1 includes a filter coefficient storing unit 101, a recovery processing unit 102, a color separation processing unit 103, an output gamma correction processing unit 104, an image storage unit 105, and a halftone processing unit 106. Image data to be input includes digital data for each of red (R), green (G), and blue (B). Image data for each color has a pixel value (8 bits) of 0 to 255 for each pixel. As used herein, the term "unit" generally refers to hardware, firmware, software or other component, such as circuitry, alone or in combination thereof, that is used to effectuate a purpose.

The filter coefficient storing unit 101 stores filter coefficients for a sharpness recovery filter previously generated by a method described below.

The recovery processing unit 102 reads out filter coefficients from the filter coefficient storing unit 101, and performs convolution computation on image data for each color. In the present exemplary embodiment, in particular, the sharpness in a low frequency region is recovered such that a frequency component lower than a predetermined frequency is mainly recovered. The characteristic of a filter for recovering the sharpness in a low-frequency region is described below.

The color separation processing unit 103 refers to a color separation table and performs color separation to separate image data for each color output from the recovery processing unit 102 into pieces of color material amount data corresponding to color materials with which the image forming unit 2 is equipped. The image forming unit 2 in the present exemplary embodiment is supposed to be equipped with color materials of cyan (C), magenta (M), yellow (Y), and black (K). Accordingly, the color separation processing unit 103 converts input image data expressed by RGB into image data for an output device expressed by CMYK. Here, image data for each of CMYK is supposed to be 8-bit data.

Figure 2B:
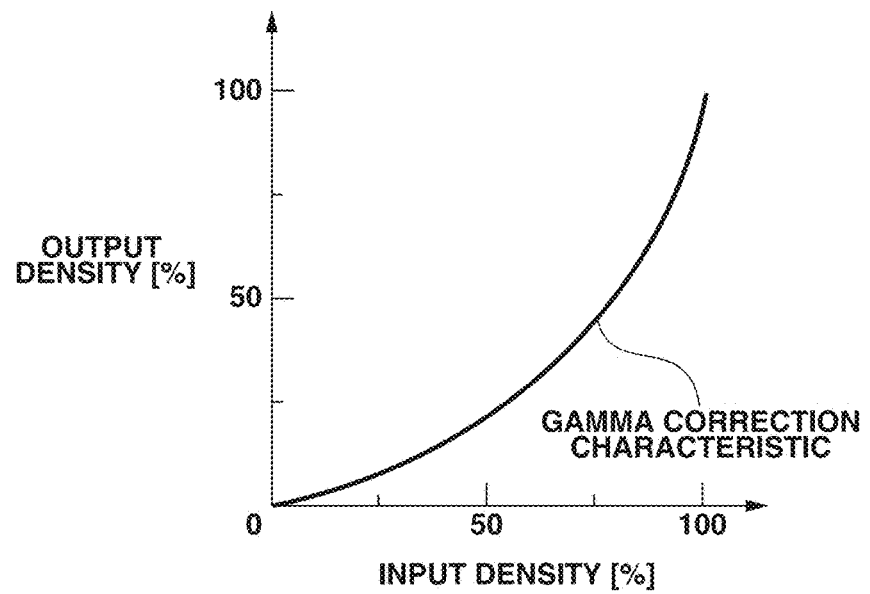

The output gamma correction processing unit 104 performs gamma correction processing on color material amount data for each color. The gamma correction processing is performed in such a way that the relationship in lightness between an input image and an output image which is formed on a recording medium by the image forming unit 2 varies in a linear manner. FIGS. 2A and 2B illustrate a gamma correction characteristic of the image forming unit 2. In each figure, the abscissa axis indicates density in an input image, and the ordinate axis indicates density in an output image. Each density is converted with the maximum density value in image data set to 100%. FIG. 2A illustrates an input-output characteristic of the image forming unit 2. As illustrated in FIG. 2A, the output density varies non-linearly with respect to a variation in the input density. FIG. 2B illustrates a gamma correction characteristic to be used for gamma correction processing. The gamma correction characteristic is set as a characteristic inverse to the input-output characteristic, so that the input density is corrected in such a way that the output characteristic subjected to the gamma correction processing becomes linear. The image storage unit 105 temporarily stores each color material amount data obtained after gamma correction.

The halftone processing unit 106 converts color material amount data into halftone image data having the number of gradation levels which is able to be output by the image forming unit 2. In the present exemplary embodiment, 8-bit color material amount data is supposed to be converted into 2-bit data composed of "0" or "1" for each pixel. Furthermore, the pixel value "0" means that no dot is placed, and the pixel value "1" means that a dot is placed. The halftone processing unit 106 generates halftone image data in which the sharpness of a frequency component higher than a predetermined frequency has been mainly recovered in color material amount data. Details thereof are described below.

The image forming unit 2 is equipped with color materials of four colors, i.e., cyan (C), magenta (M), yellow (Y), and black (K), and discharges color materials of the respective colors onto a recording material based on the halftone image data, thus forming an image. FIG. 6A illustrates the flow of processing performed by constituent units of the image processing apparatus 1. In step S601, the recovery processing unit 102 reads image data. In step S602, the recovery processing unit 102 reads a filter coefficient from the filter coefficient storing unit 101. In step S603, the recovery processing unit 102 performs sharpness recovery processing of a low-frequency region by performing convolution computation using the filter coefficient for every pixel of the read image data. In step S604, the color separation processing unit 103 converts the image data subjected to the sharpness recovery processing for each of RGB into four pieces of color material amount data for CMYK. In step S605, the output gamma correction processing unit 104 performs gamma correction on the color material amount data for each color while referring to the gamma correction characteristic illustrated in FIG. 2B.

In step S606, the halftone processing unit 106 converts the color material amount data for each color into halftone image data having the lower number of gradation levels, and outputs the halftone image data. Details of the halftone processing are described below.

Figure 3:
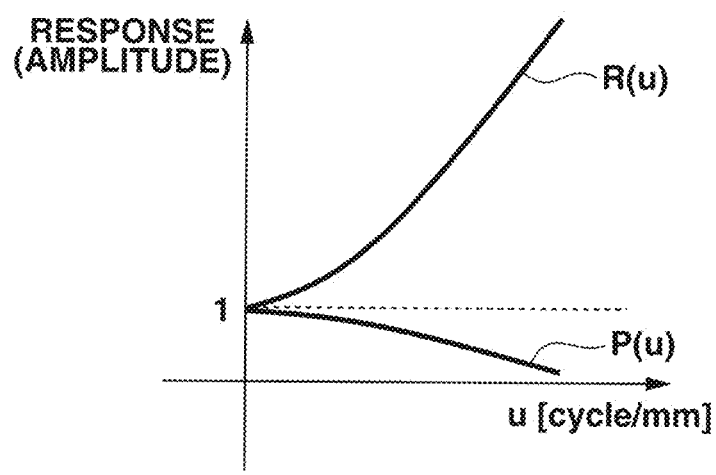
FIG. 3 illustrates a frequency characteristic of the image forming apparatus and a characteristic inverse thereto according to one or more aspects of the present disclosure.

Here, the relationship between the sharpness recovery and a decrease in image brightness is described. When an image is formed on a recording material, the sharpness of the image decreases due to a fluctuation of the dot position or the spread of ink. Therefore, sharpness recovery processing is performed on an input image with the use of a filter having a characteristic inverse to the frequency characteristic of an output image, so that a decrease in sharpness in the output image can be compensated for. FIG. 3 illustrates a frequency characteristic of the output image and a characteristic inverse thereto. The abscissa axis indicates spatial frequency, and the ordinate axis indicates response (amplitude). A frequency characteristic $P(u)$ of the output image at a spatial frequency u and a characteristic $R(u)$ inverse to the frequency characteristic $P(u)$ ($R(u)=1/P(u)$) are illustrated. At this time, a filter obtained by performing inverse Fourier transform on the inverse characteristic $R(u)$ is used for sharpness recovery processing.

However, as mentioned above, when sharpness recovery processing is performed on an input image in an image forming apparatus, the average brightness decreases in a high-frequency region. An example in which the brightness decreases when recovery processing is performed according to the inverse characteristic $R(u)$ is indicated by a curved line $L(u)$ illustrated in FIG. 4A. The abscissa axis indicates frequency, and the ordinate axis indicates brightness. The curved line $L(u)$ indicates the average brightness of an output image relative to the frequency u in a case where a sine wave image having the frequency u and an amplitude of the average lightness Lave is imaged.

Figure 4A:
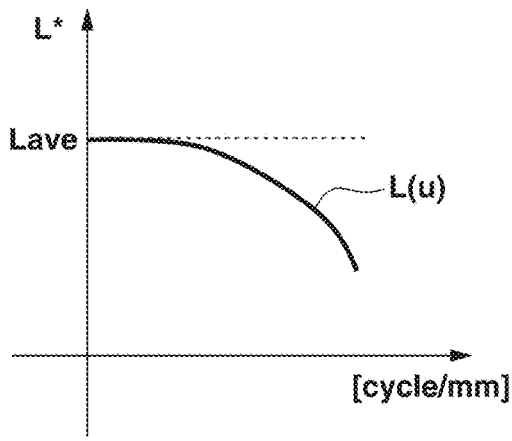
FIGS. 4A and 4B each illustrate a decrease in brightness occurring when sharpness recovery processing is performed according to a characteristic inverse to the frequency characteristic of the image forming apparatus according to one or more aspects of the present disclosure.

As illustrated in FIG. 4A, it is found that the average brightness decreases in a high-frequency region.

Such a decrease in brightness is caused by the average output density value being raised by gamma correction processing performed after the sharpness recovery processing.

Figure 5A:
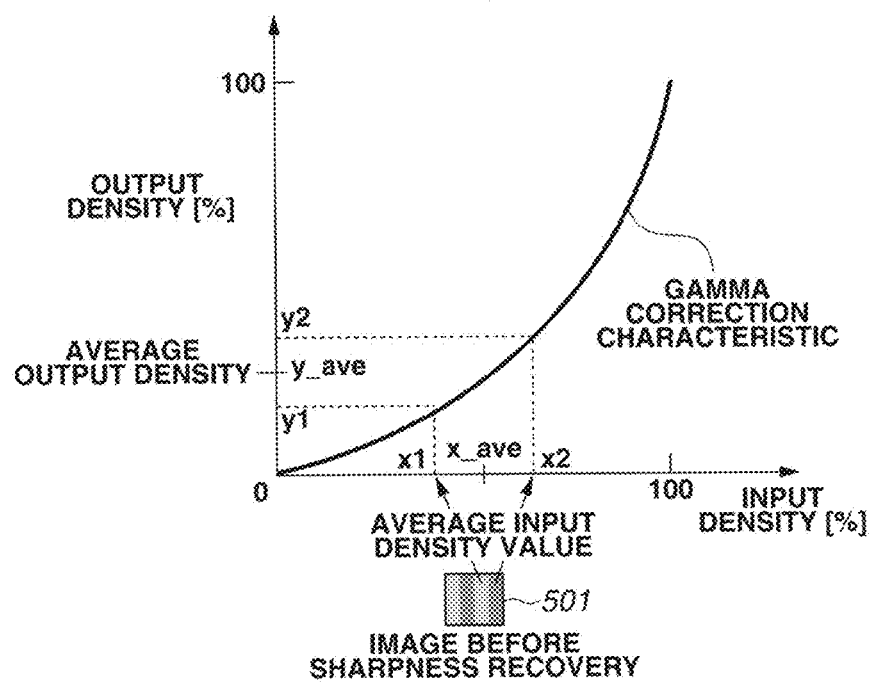
FIGS. 5A and 5B each illustrate a rise in average output density caused by gamma correction according to one or more aspects of the present disclosure.
Figure 5B:
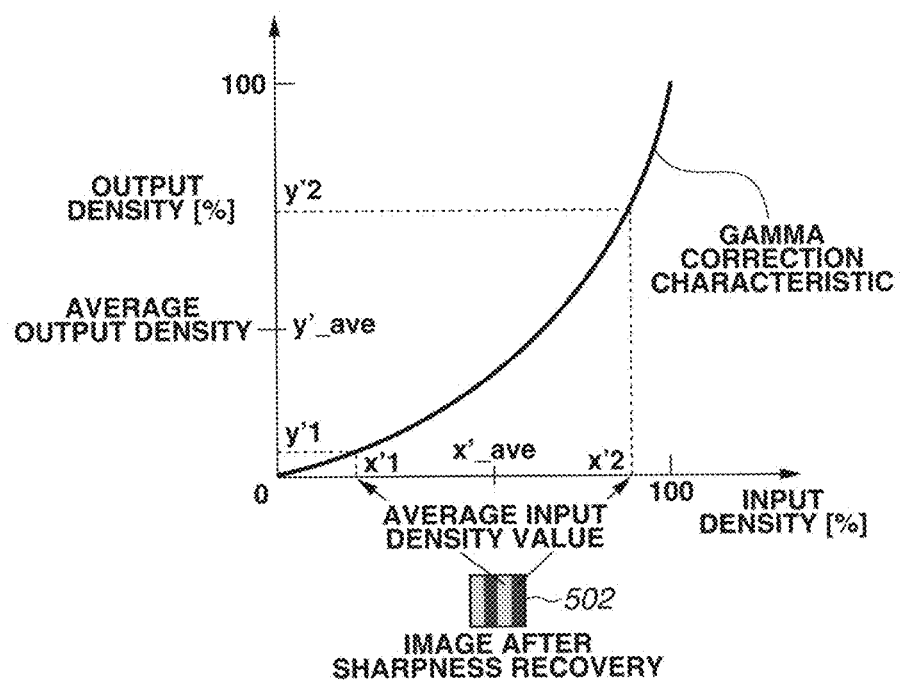

FIGS. 5A and 5B illustrate a decrease in brightness caused by gamma correction processing. Here, for ease of description, rectangular wave images expressed by two types of pixel values, such as an image 501 and an image 502, are taken as an example for description.

Each of the images 501 and 502 is an image obtained by reducing a rectangular wave image in which a bright region and a dark region are alternately arranged in two pairs. Each pixel of the bright region of the image 501 has a pixel value x1, and each pixel of the dark region thereof has a pixel value x2. The image 502 is obtained by performing sharpness recovery processing on the image 501. FIG. 5A indicates the brightness in an image before being subjected to sharpness recovery processing. When gamma correction processing is performed on each of the pixel values x1 and x2 of the image 501, the output densities thereof obtained after the gamma correction become y1 and y2, respectively, and their average value becomes y_ave. FIG. 5B indicates the brightness in an image after being subjected to sharpness recovery processing. When sharpness recovery processing is performed, contrast is emphasized while the average value of the brightness of the image 501 is maintained. Accordingly, the image 501 before being subjected to sharpness recovery and the image 502 after being subjected to sharpness recovery have the same average brightness value (x_ave=x'_ave). Here, when gamma correction processing is performed on each of the pixel values x'1 and x'2 of the image 502, the output densities thereof obtained after the gamma correction become y'1 and y'2, respectively, and their average value becomes y'_ave. As apparent from FIGS. 5A and 5B, the image 501 before being subjected to sharpness recovery is larger in the average brightness obtained after gamma correction than the image 502 after being subjected to sharpness recovery (y'_ave>y_ave). The gamma correction characteristic of an image forming apparatus such as a printer is generally in a shape convex downward. Therefore, even if the average value of the brightness in the images before gamma correction is the same, when gamma correction processing is performed on the image after being subjected to sharpness recovery, the brightness thereof would decrease.

Such an increase of the output density becomes larger as the amount of recovery in the sharpness recovery processing is larger. The characteristic of a sharpness recovery filter becomes a characteristic such as the characteristic $R(u)$ illustrated in FIG. 3. Therefore, in a higher-frequency region, in which the larger amount of recovery is required, a decrease in brightness in the output density occurs.

Therefore, according to the present exemplary embodiment, recovery processing in a low-frequency region is performed by the recovery processing unit 102, and the recovery of sharpness in a high-frequency region is performed in halftone processing after gamma correction. FIG. 1B is a block diagram illustrating a detailed configuration of the halftone processing unit 106. A block division unit 107 divides input color material amount data into predetermined blocks (local regions), and outputs pixel values of pixels included in a processing target block to each of an average value calculation unit 108, a comparison unit 110, an edge intensity calculation unit 109, and a distribution order determination unit 111. The average value calculation unit 108 averages pixel values of pixels in the processing target block and outputs an average value. The comparison unit 110 compares the average value of the processing target block with the pixel value of each pixel in the processing target block and divides the pixels into two groups, i.e., a low-density pixel group and a high-density pixel group. The edge intensity calculation unit 109 calculates a variance value of pixel values in the processing target block. The variance value as calculated herein indicates the edge intensity of the processing target block.

The distribution order determination unit 111 acquires threshold value data corresponding to the processing target block, and determines a distribution order of dots in the processing target block based on pixel values of the pixels in the processing target block and threshold values corresponding to the respective pixels. In the present exemplary embodiment, as illustrated in FIG. 8A, a threshold value matrix having a blue noise characteristic composed of 256 pixels×256 pixels is supposed to be used. In the threshold value matrix, different threshold values are arranged in association with the respective pixels. The threshold value matrix is used for dither processing in which quantization is performed such that, if the pixel value is greater than the threshold value, it is converted into "1" and, if the pixel value is equal to or less than the threshold value, it is converted into "0". The smaller threshold value causes the quantization result to be likely to be converted into "1" (dot). Furthermore, in a case where the size of image data is larger than the size of the threshold value matrix, the threshold value matrix is repeatedly arranged in a tile shape, so that threshold values are associated with all of the pixels. The distribution order determination unit 111 calculates a difference between a pixel value and a threshold value as an evaluation value of each pixel for every pixel in the processing target block, and determines a distribution order in order of larger evaluation value.

To calculate the number of quantization values "1" (dots) to be placed in the processing target block, a target value calculation unit 113 compares the average value of the processing target block with threshold value data corresponding to the processing target block to perform quantization. Then, the target value calculation unit 113 outputs a value obtained by counting the quantization result as a target value. An output value determination unit 112 determines an output value of the processing target block while referring to the target value and the distribution order with respect to the processing target block.

Figure 7:
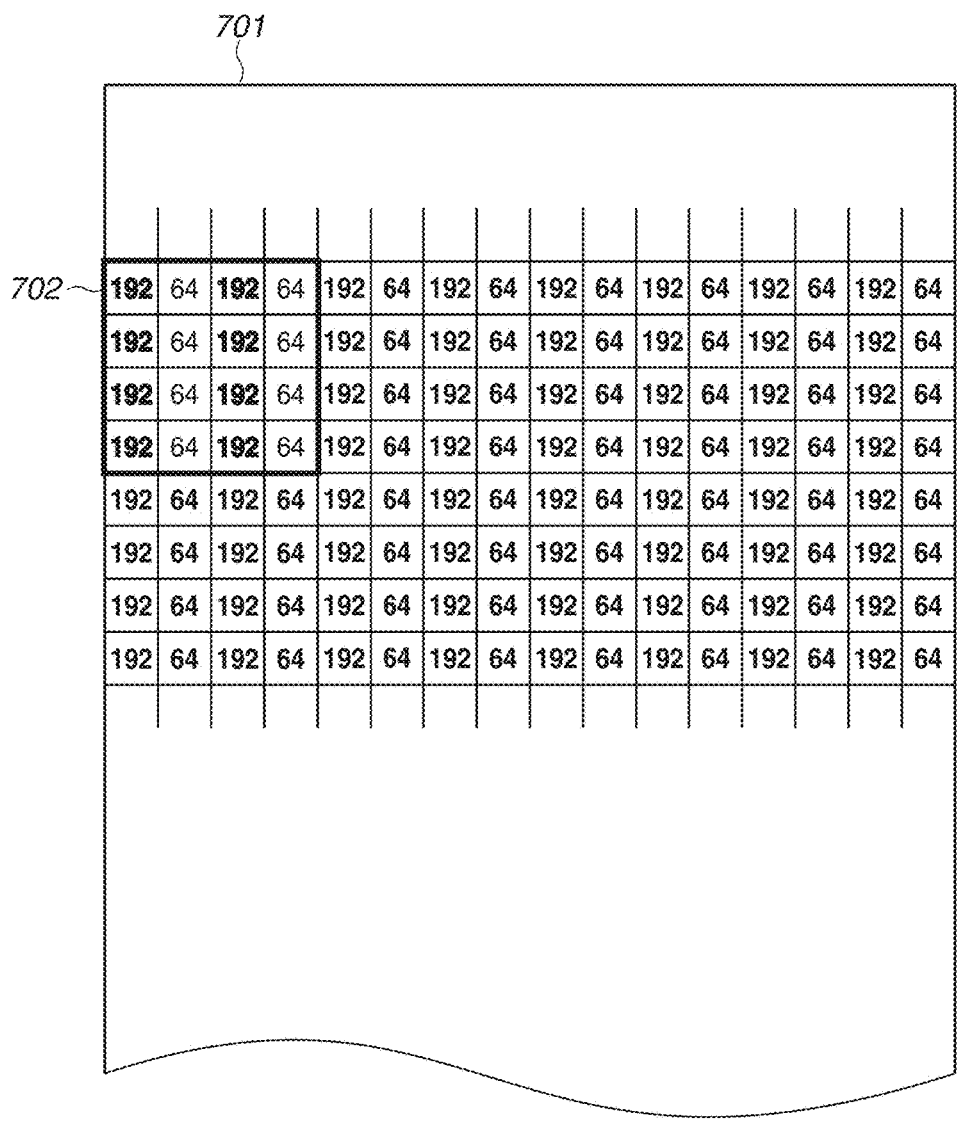
FIG. 7 illustrates an example of image data according to one or more aspects of the present disclosure.

FIG. 6B is a flowchart illustrating the flow of detailed processing performed by the halftone processing unit 106. In step S607, the block division unit 107 reads color material amount data subjected to gamma correction from the image storage unit 105, and divides the data into processing target blocks. Here, 8-bit image data 701 such as that illustrated in FIG. 7 is supposed to be divided into processing target blocks each of which is a rectangular region composed of 4 pixels×4 pixels. In the following description of processing, processing performed on a block 702 in the image data 701 is taken as an example. In step S608, the average value calculation unit 108 calculates an average value of pixel values of the pixel group in the processing target block. In the case of the block 702 illustrated in FIG. 7, "128" is calculated as the average value of pixel values. In step S609, the halftone processing unit 106 acquires threshold value data corresponding to the position of the processing target block. Since the processing target block is a block composed of 4 pixels×4 pixels, here, 16 threshold values are acquired.

In step S610, the target value calculation unit 113 calculates a quantization result by comparing the average value of the processing target block calculated in step S608 with the respective threshold values acquired in step S609. FIG. 8B illustrates a case where processing is performed on the block 702. The average value 804 and the threshold value group 801 are compared with each other, and a pixel in which the threshold value is larger than the average value is set to "0" and a pixel in which the threshold value is smaller than the average value is set to "1", so that a quantization result 806 is obtained. In the quantization result 806, a filled-square pixel indicates that the quantization result is "1" and an unfilled-square pixel indicates that the quantization result is "0". If the input pixel value varies at values close to the threshold value, when the input pixel value and the threshold value are compared with each other, the input pixel value and the threshold value interfere with each other, so that the density of the input image may become unable to be stored. For example, if the input pixel value varies at values just a little larger than the threshold value, all of the values would be quantized to "1", while the input pixel value varies at values just a little smaller than the threshold value, all of the values would be quantized to "0". Therefore, in step S610, to cancel out the variation of the input pixel value, the average value of the processing target block is used to be compared with the threshold value, so that a quantization result corresponding to the density of the processing target block is calculated.

In step S611, the target value calculation unit 113 tallies the quantization results calculated in step S610. Here, the number of pixels in which the quantization result calculated in step S610 is "1" (filled-square pixel) is calculated. In the example illustrated in FIG. 8B, the tallying result is "8". The tallying result serves as a target value of the processing target block when dots are arranged in step S617 described below.

In step S612, the edge intensity calculation unit 109 calculates a variance value of the processing target block. The variance value is obtained by calculating the sum of squares of numbers obtained by subtracting the average value of pixel values of the processing target block from pixel values of the respective pixels in the processing target block, and dividing the calculated sum by the number of pixels of the processing target block. Where the pixel value at coordinates (i, j) of a pixel in the processing target block is denoted by x_ij, the average value is denoted by xa, and the number of pixels is denoted by N, the variance value is obtained by the following formula (1):

$$\text{Variance value } \sigma^2 = 1/N \times \Sigma(x\_ij - xa)^2 \quad (1)$$

In the case of the block 702 illustrated in FIG. 7, the variance value is "4096".

In step S613, the comparison unit 110 groups the pixels of the processing target block. The comparison unit 110 divides the pixels into two groups, i.e., a high-density pixel group and a low-density pixel group with the average value calculated in step S608 set as the boundary. More specifically, a pixel with a pixel value larger than the average value is set as a high-density pixel, and a pixel with a pixel value equal to or smaller than the average value is set as a low-density pixel. In the case of the block 702 illustrated in FIG. 7, the high-density pixel is indicated by a thick line numeric character, and the low-density pixel is indicated by a thin line numeric character. Since the average value is "128", eight pixels with a pixel value of "192" and eight pixels with a pixel value of "64" are grouped into high-density pixels and low-density pixels, respectively.

In step S614 and step S615, the distribution order determination unit 111 calculates evaluation values of the respective pixels so as to determine an order of priority in which to distribute dots to the processing target block (hereinafter referred to as a "distribution order"). With respect to a pixel determined as a low-density pixel in step S613 (NO in step S613), processing in step S614 is used to calculate the evaluation value, and, with respect to a pixel determined as a high-density pixel in step S613 (YES in step S613), processing in step S615 is used to calculate the evaluation value. In step S614, the distribution order determination unit 111 calculates the evaluation value of each pixel based on the pixel value and the threshold value with respect to low-density pixels. More specifically, the distribution order determination unit 111 calculates the evaluation value as "evaluation value=pixel value−threshold value". As the pixel value becomes larger, a dot is more likely to be preferentially distributed to the pixel, and, when the corresponding threshold value is small, a dot is also more likely to be preferentially distributed to the pixel. If the input values are constant, since the order in which dots are distributed is determined only depending on the magnitudes of threshold values, output gradation level values are determined according to an order corresponding to the characteristic of an original threshold value matrix.

On the other hand, in step S615, the distribution order determination unit 111 calculates the evaluation value of each pixel based on the pixel value, the threshold value, and the variance value with respect to high-density pixels. More specifically, the distribution order determination unit 111 calculates the evaluation value as "evaluation value=pixel value−threshold value+variance value×k". Furthermore, k is an adjustment parameter for sharpness recovery. As the adjustment parameter k is set larger, contrast becomes larger and sharpness increases. In step S615, with respect to a high-density pixel, weighting corresponding to the variance value is additionally applied to the evaluation value calculated with respect to a low-density pixel. A case where the variance value of the processing target block is large means that the processing target block is large in edge intensity. In other words, in a case where an edge is included in the processing target block, the evaluation value of a high-density pixel is likely to be calculated as a larger value than the evaluation value of a low-density pixel. Even when this weighting is applied with respect to a low-density pixel, a similar advantageous effect can be obtained. In that case, with respect to a pixel determined as a high-density pixel in step S613, the evaluation value is calculated as "evaluation value=pixel value−threshold value", and, with respect to a pixel determined as a low-density pixel, the evaluation value is calculated as "evaluation value=pixel value−threshold value−variance value×k". Moreover, positive weighting and negative weighting can be respectively applied to both a high-density pixel and a low-density pixel. In that case, with respect to a pixel determined as a high-density pixel in step S613, the evaluation value is calculated as ""evaluation value=pixel value−threshold value+variance value×k", and, with respect to a pixel determined as a low-density pixel, the evaluation value is calculated as "evaluation value=pixel value−threshold value−variance value×k".

In step S616, the distribution order determination unit 111 determines a distribution order of the processing target block based on the evaluation values of the respective pixels calculated in step S614 and step S615. In the present exemplary embodiment, the pixels are sorted in the order from a larger evaluation value to a smaller evaluation value to determine the distribution order. In a case where the evaluation value is the same in a plurality of pixels, their order can be determined based on the magnitude of the pixel value or the threshold value. In the present exemplary embodiment, in a case where the evaluation value is the same, a pixel with a smaller threshold value is prioritized as a higher distribution order. Furthermore, in a case where the pixel value is the minimum value (0) or the maximum value (255) in the range of pixel values, the distribution order can be determined, for example, without performing sort processing. For example, in a case where the pixel value is the minimum value, the distribution order can be determined as being always set to the last place, and, in a case where the pixel value is the maximum value, the distribution order can be determined as being always set to the first place, and sort processing can be performed on the evaluation values of the remaining pixels.

In step S617, the output value determination unit 112 determines pixels in which to place dots in the processing target block based on the target value and the distribution order of the processing target block, and outputs output values of the respective pixels. The output value determination unit 112 determines pixels in which the output value is to be set to "1" (dot being placed) in the distribution order until the target value is reached, and sets the output value to "0" in the remaining pixels after the target value is reached. In this way, the processing performed by the halftone processing unit 106 is completed. FIG. 9 illustrates an effect obtained by the processing in the present exemplary embodiment. For example, FIG. 9 illustrates a case where halftone processing is performed on the block 702 illustrated in FIG. 7 with the use of the threshold value group 801 illustrated in FIG. 8A. An evaluation value calculation result 1101 indicates a result obtained when k=0 is set, in other words, in a case where the evaluation value is calculated based on only the pixel value and the threshold value with respect to all of the pixels. In this case, the evaluation value is calculated by the same calculation method in both a low-density pixel and a high-density pixel. Since the target value in the block 702 is "8", "dot ON" (the output value being "1") is set to the top eight pixels with larger evaluation values and "dot OFF" (the output value being "0") is set to the other eight pixels, so that a halftone image 1102 is obtained. On the other hand, an evaluation value calculation result 1103 indicates an example of a result obtained when k=0.005 is set. In this case, with respect to high-density pixels in the block 702, the evaluation value is calculated by additionally applying weighting of "variance value×k=20" to the evaluation value calculation method for low-density pixels. From the evaluation values calculated in this way, a halftone image 1104 is obtained. Moreover, an evaluation value calculation result 1105 indicates an example of a result obtained when k=0.01 is set. In this case, with respect to high-density pixels in the block 702, the evaluation value is calculated by additionally applying weighting of "variance value×k=41" to the evaluation value calculation method for low-density pixels. From the evaluation values calculated in this way, a halftone image 1106 is obtained.

The comparison between the halftone images 1102, 1104, and 1106 shows that applying weighting to the evaluation value of a high-density pixel such that a value larger as much as the variance value is calculated causes contrast in the halftone image to be enhanced and sharpness to be increased. The reason for this is that, as the variance value in the processing target block is larger (the edge intensity is higher), the evaluation value of a high-density pixel is calculated in such a way as to be a larger value than the evaluation value of a low-density pixel, so that a dot is likely to be preferentially allocated to a high-density pixel. In this way, since contrast enhancement is performed according to an edge, the halftone processing unit 106 is able to perform recovery processing of a high-frequency region which is not recovered by the recovery processing unit 102. As a result, sharpness can be recovered in the entire range from a low-frequency region to a high-frequency region while a decrease in brightness, which would be caused by sharpness recovery processing, is prevented.

Figure 4B:
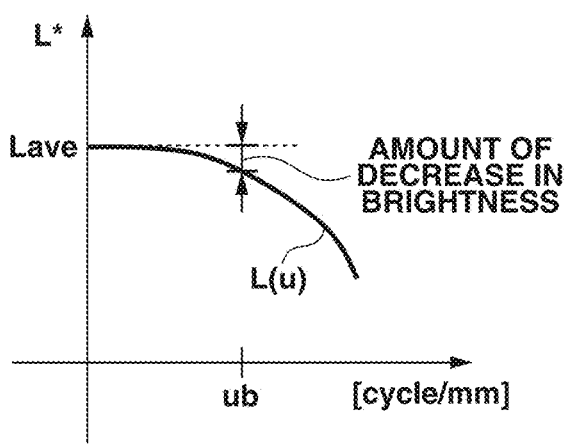
Figure 11:
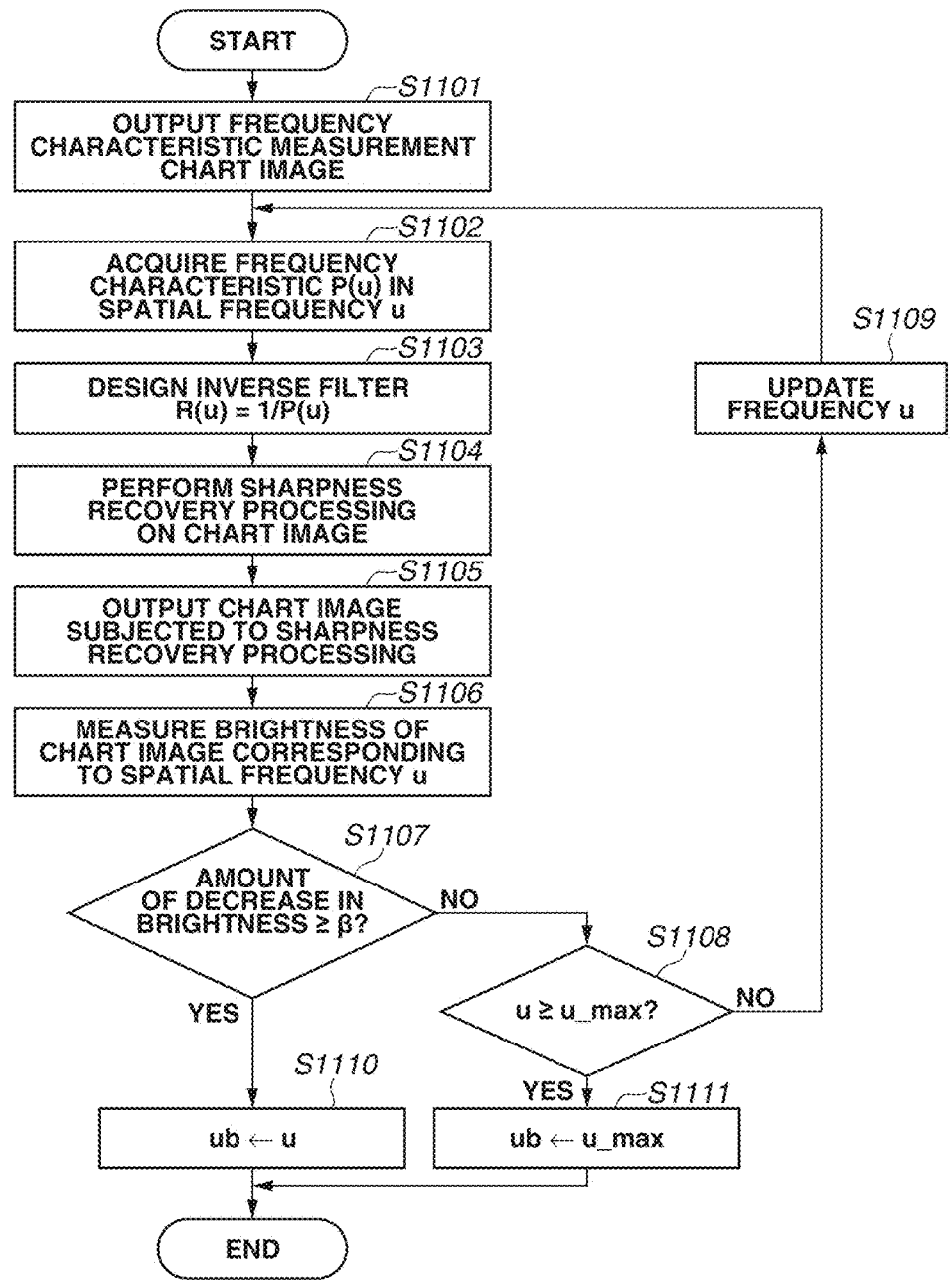
FIG. 11 is a flowchart illustrating a method for determining a predetermined frequency according to one or more aspects of the present disclosure.

As described above, in the present exemplary embodiment, the recovery processing unit 102 performs sharpness recovery processing in frequencies equal to or lower than a predetermined frequency. Then, a method for determining the predetermined frequency ub is described. The recovery processing unit 102 in the present exemplary embodiment targets, for recovery processing, frequencies equal to or lower than the predetermined frequency ub, at which a decrease in brightness begins to occur by a predetermined amount or more in a case where sharpness recovery processing of all of the frequency components is performed before gamma correction processing as illustrated in FIG. 4B. In the following description, the method for determining the predetermined frequency ub is described in detail with reference to the flowchart of FIG. 11. Furthermore, the following method for determining the predetermined frequency ub is performed when the image processing apparatus 1, which is incorporated in the above image forming apparatus 3, is designed.

Figure 12:
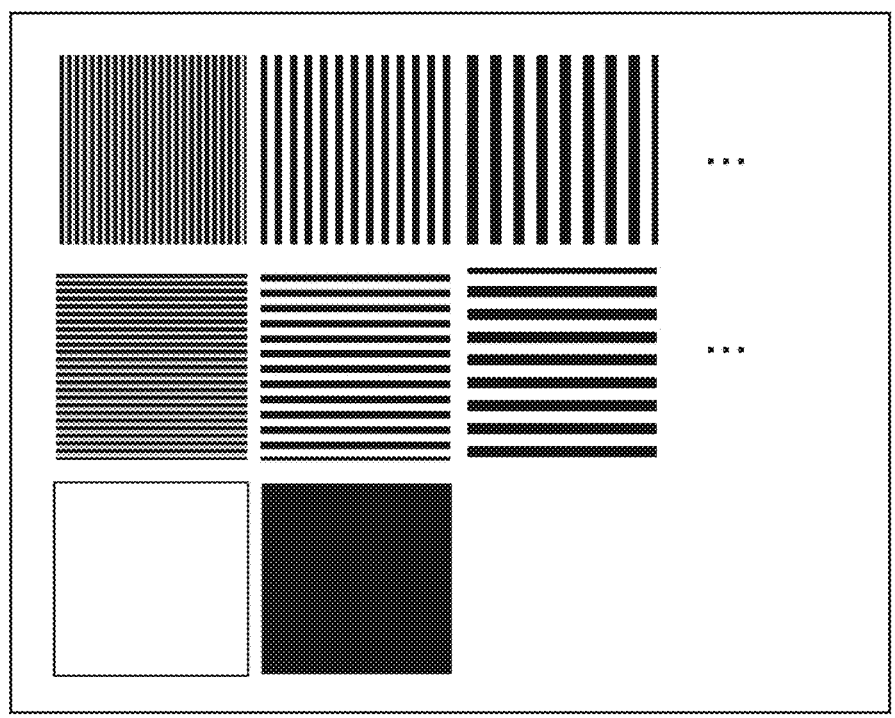
FIG. 12 illustrates an example of a frequency characteristic measurement chart according to one or more aspects of the present disclosure.

In step S1101, the image forming unit 2 is caused to output a frequency characteristic measurement chart on a recording medium. Furthermore, when the measurement chart is output, sharpness recovery processing and contrast enhancement in the halftone processing unit 106 are not performed. In other words, recovery filter processing is not performed, and, in the above-described halftone processing, k=0 is set. FIG. 12 illustrates an example of the measurement chart. Here, solid-color images and a plurality of sinusoidal patterns with respective different frequencies are used.

In step S1102, the measurement chart on the recording medium is measured with the use of a measurement apparatus (not illustrated). Examples of the measurement apparatus to be used include a scanner, a digital camera, a microscope, and a microdensitometer. Here, a scanner is supposed to be used. The measurement chart on the recording medium is read with the use of a scanner, and a frequency characteristic (frequency response value) $P(u)$ of the image forming apparatus 3 is calculated based on the acquired read result. The frequency characteristic $P(u)$ can be expressed by an optical transfer function (MTF) which is calculated by the following formula (2):

$$P(u)=C(u)/C' \qquad (2)$$

where u is the frequency of a sine wave, $$C(u)=\{Max(u)-Min(u)\}/\{Max(u)+Min(u)\},$$

$$C'=(White-Black)/(White+Black),$$

Max(u) is the maximum lightness of a sinusoidal pattern which varies at the frequency u,
Min(u) is the minimum lightness of a sinusoidal pattern which varies at the frequency u, and
each of White and Black is the lightness of a homogenous pattern.

Naturally, the calculation of an optical transfer function is not limited to formula (2), and, for example, the following formula (3) can be used.

$$P(u)=\{Max(u)-Min(u)\}/(White-Black) \qquad (3)$$

Furthermore, while, in formula (2) and formula (3), the frequency characteristic $P(u)$ is calculated with the use of lightness values Max(u), Min(u), White, and Black, it can also be calculated with the use of, for example, luminance, density, and device RGB values of the measurement apparatus. Furthermore, in the measurement chart to be output in step S1101, the frequency characteristic $P(u)$ can be acquired with the use of not a sinusoidal pattern such as that illustrated in FIG. 12 but a rectangular-wave pattern. In that case, the value of a contrast transfer function (CTF) calculated by applying formula (2) to the rectangular-wave pattern is used as the frequency characteristic $P(u)$. Alternatively, an MTF value obtained by converting a CTF value using a known Coltman correction formula can be used as the frequency characteristic $P(u)$.

In step S1103, the frequency characteristic $R(u)=1/P(u)$ of a sharpness recovery filter is calculated based on the frequency characteristic $P(u)$ acquired in step S1102. In step S1104, sharpness recovery processing is performed on the chart image by calculating a filter coefficient by performing inverse Fourier transform on the frequency characteristic of the sharpness recovery filter calculated in step S1103 and, then, performing convolution computation on the chart image. Here, the filter size used for sharpness recovery processing is supposed to be 63 pixels×63 pixels, and, in the measurement chart image, the color space is converted from RGB to YCbCr and convolution computation is performed on the Y (luminance signal). In step S1105, the image forming unit 2 is caused to output the measurement chart on the recording medium based on the chart image subjected to the sharpness recovery processing in all of the frequency bands in step S1104.

In step S1106, the measurement chart on the recording medium is re-measured with the use of the measurement apparatus (not illustrated), and the average brightness in the spatial frequency u is calculated. In step S1107, it is determined whether the brightness measured in step S1106 has a difference equal to or greater than a predetermined amount β from an intended brightness value. If it is determined that the amount of decrease in brightness is equal to or greater than the predetermined amount β (YES in step S1107), then in step S1110, the frequency u at that time is set as the frequency ub. Otherwise (NO in step S1107), then in step S1108, the frequency u is compared with the output resolution u_max of the image forming apparatus 3. If u≥u_max (YES in step S1108), then in step S1111, the frequency u_max is set as the frequency ub, and the processing then ends. If not u≥u_max (NO in step S1108), then in step S1109, the frequency u is updated, and the processing then returns to step S1102. Furthermore, the frequency u is caused to vary in stages from a low frequency toward a high frequency. According to the above-described processing, a frequency band which the recovery processing unit 102 targets for sharpness recovery processing can be determined.

Figure 13:
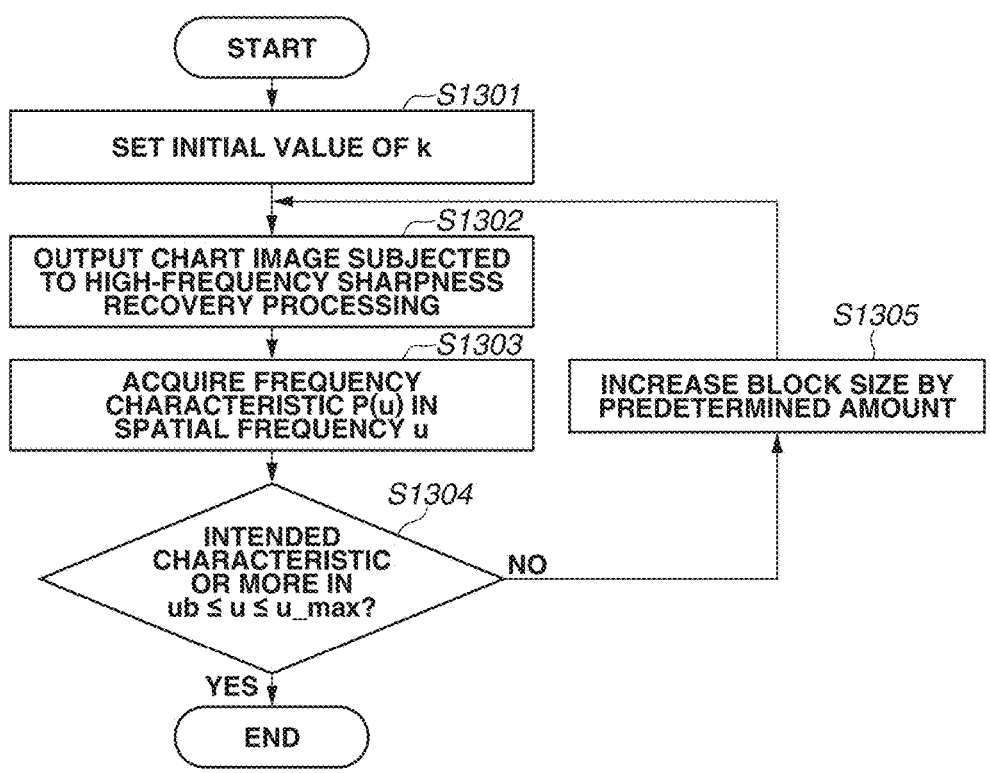
FIG. 13 is a flowchart illustrating a method for determining a block size in the halftone processing according to one or more aspects of the present disclosure.

Next, the size of a local region (block) serving as a unit of processing in the above-described halftone processing and the adjustment parameter k for sharpness recovery are determined in such a way as to mainly recover frequency components equal to or higher than the frequency ub. A method for determining the size of a block serving as a unit of processing in the present exemplary embodiment is described with reference to the flowchart of FIG. 13. Furthermore, the following method is performed when the image processing apparatus 1, which is incorporated in the above image forming apparatus 3, is designed.

First, in step S1301, the adjustment parameter k is set to a sufficiently large value so that the maximum recovery processing can be performed. In the present exemplary embodiment, k=1 is set. Furthermore, the frequency ub is previously determined based on the determination method illustrated in FIG. 11, and the recovery processing unit 102 is caused to perform sharpness recovery processing in frequencies equal to or lower than the frequency ub on the chart image. In step S1302, the measurement chart used to measure the frequency characteristic is binarized by the above-described halftone processing, and is then output onto the recording medium by the image forming unit 2. In step S1303, the measurement chart on the recording medium is read by the measurement apparatus (not illustrated), and the frequency characteristic $P(u)$ of the image forming apparatus 3 is calculated based on the read result.

In step S1304, it is determined whether the amplitude in the frequency characteristic $P(u)$ acquired in step S1303 is equal to or greater than an intended value in all of the frequencies u satisfying ub≤u≤u_max. If the amplitude in the frequency characteristic of the measurement chart is not equal to or greater than the intended value (NO in step S1304), then in step S1305, the block size is increased by a predetermined amount, and the processing then returns to step S1302. If the amplitude is equal to or greater than the intended value (YES in step S1304), the block size at that time is acquired, and the processing for determining the block size then ends.

Figure 14:
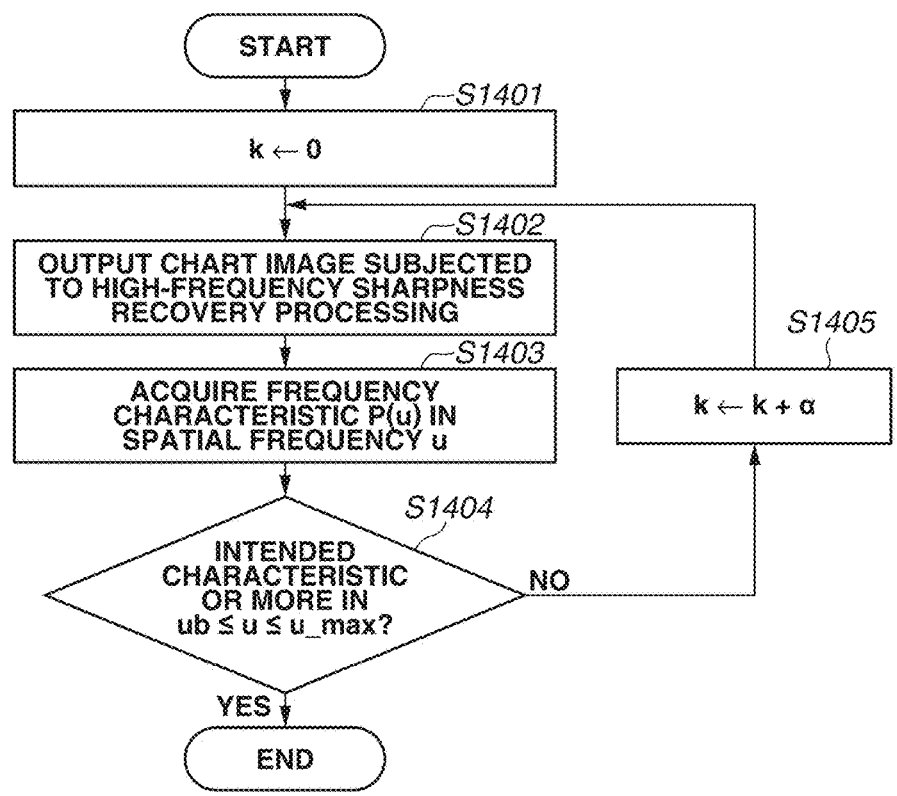
FIG. 14 is a flowchart illustrating a method for determining an adjustment parameter for sharpness recovery in the halftone processing according to one or more aspects of the present disclosure.

Next, a method for determining the adjustment parameter k for sharpness recovery is described. In the present exemplary embodiment, the minimum numerical value sufficient to recover frequency components equal to or higher than the frequency ub is supposed to be selected as the adjustment parameter k. Details are described with reference to the flowchart of FIG. 14. First, in step S1401, the adjustment parameter k is set to "0". In step S1402, the chart image is binarized by the halftone processing unit 106, and is then output onto the recording medium by the image forming unit 2. The block size to be used at this time is the one determined by the above-described method.

In step S1403, the measurement chart on the recording medium is read by the measurement apparatus (not illustrated), and the frequency characteristic P(u) of the image forming apparatus 3 is calculated based on the read result. In step S1404, it is determined whether the amplitude in the frequency characteristic P(u) acquired in step S1403 is equal to or greater than an intended value in all of the frequencies u satisfying ub≤u≤u_max. If the amplitude is not equal to or greater than the intended value (NO in step S1404), then in step S1405, the adjustment parameter k is increased by a predetermined amount α, and the processing then returns to step S1402. If the amplitude is equal to or greater than the intended value (YES in step S1404), the adjustment parameter k at that time is acquired, and the processing for determining the adjustment parameter k then ends.

Next, a method for generating a sharpness recovery filter Fl(u) for a low-frequency region, which mainly recovers frequency components lower than the frequency ub, is described. As mentioned above, a decrease in brightness by sharpness recovery processing is caused by the average of output densities being raised by gamma correction. On the other hand, clipping processing in the filter processing for sharpness recovery may also cause the average of output densities to vary and may also cause a decrease in brightness. In a case where the pixel value of an input image is 8-bit, the range of representable values is "0" to "255", and negative values or values exceeding "255" are not able to be represented. Therefore, in a case where the result of filter processing for sharpness recovery exceeds the range of representable values, the value of the result is rounded off by clipping processing to a representable value. For example, in a case where filter processing is performed on a rectangular-wave image with pixel values of "50" and "150" and the image is converted into pixels with pixel values of "−50" and "250", the negative value "−50" is rounded off to "0". As a result, the average pixel value, which has been "100" before filter processing, would change to "125" after filter processing.

Therefore, in filter processing performed by the recovery processing unit 102 in the present exemplary embodiment, the amount of recovery of a filter is set in such a way as to prevent clipping processing from occurring. Clipping processing depends on an image targeted by filter processing. In the present exemplary embodiment, a chart image having a predetermined amplitude based on an intermediate value of the range of representable values is used to design a sharpness recovery filter in such a way as to prevent clipping processing from occurring.

Figure 15:
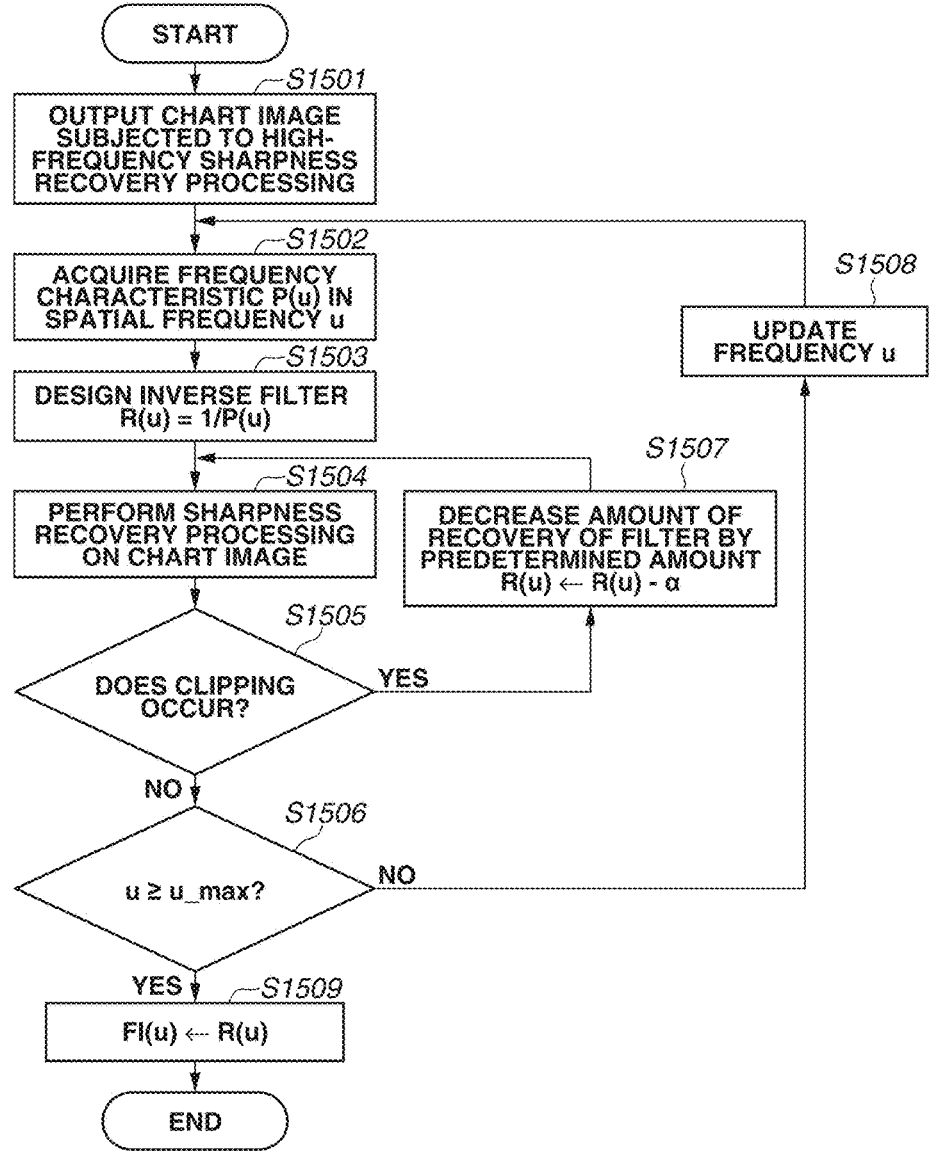
FIG. 15 is a flowchart illustrating a method for generating a recovery filter according to one or more aspects of the present disclosure.

A method for generating the sharpness recovery filter Fl(u) is described in detail with reference to the flowchart of FIG. 15. Furthermore, processing in steps S1502 and S1503 is respectively similar to that in steps S1102 and S1103 illustrated in FIG. 11, and the detailed description thereof is, therefore, not repeated. The sharpness recovery filter Fl(u) is designed based on a chart image output by performing the above-described halftone processing with the halftone processing unit 106. First, in step S1501, a chart image is binarized by the above-described halftone processing for sharpness recovery of high-frequency components, and a measurement chart is output on a recording medium by the image forming unit 2. At this time, the block size, which serves as a unit of processing for halftone processing, and the adjustment parameter k to be used are the ones determined by the above-described method. In step S1504, sharpness recovery processing is performed on the chart image by calculating a filter coefficient by performing inverse Fourier transform on the calculated frequency characteristic of the sharpness recovery filter and, then, performing convolution computation on the chart image. In the present exemplary embodiment, the filter size is supposed to be 63 pixels×63 pixels, and, in the measurement chart image, the color space is converted from RGB to YCbCr and convolution computation is performed on the Y (luminance signal).

In step S1505, it is determined whether pixel values of the image subjected to sharpness recovery processing exceed the range of representable values (whether clipping occurs). If it is determined that clipping occurs (YES in step S1505), then in step S1507, the amount of recovery of the filter is decreased by a predetermined amount α to update the frequency characteristic R(u), and the processing then returns to step S1504, in which sharpness recovery processing is re-performed. Such a series of operations is repeatedly performed until clipping ceases to occur. If it is determined that clipping does not occur (NO in step S1505), then in step S1506, the frequency u is compared with the output resolution u_max of the image forming apparatus 3. If u≥u_max (YES in step S1506), then in step S1509, the frequency characteristic R(u) is set to the sharpness recovery filter Fl(u), and the processing then ends. If not u≥u_max (NO in step S1506), then in step S1508, the frequency u is updated, and the processing then returns to step S1502.

In the above-described filter generation procedure, a low-frequency sharpness recovery filter which the recovery processing unit 102 uses is generated based on a chart image subjected to halftone processing capable of recovering high-frequency sharpness. This enables the low-frequency sharpness recovery filter, which has a large size, to have the function of absorbing a difference from an intended frequency characteristic which occurs due to halftone processing, so that appropriate sharpness recovery processing can be performed.

Furthermore, in the above description, the frequency characteristic of an output image is treated as a one-dimensional function P(u). However, it is known that the frequency characteristic of a printer has anisotropy, and, in actuality, it is desirable that the frequency characteristic of a sharpness recovery filter be designed as a two-dimensional function P(u, v) with the frequency u and the frequency v which is in a direction perpendicular to that of the frequency u. Moreover, while the size of the low-frequency sharpness recovery filter is 63 pixels×63 pixels, this is not limiting, but the filter can have a different size.

Furthermore, while, in recovery processing, the color space is converted from RGB to YCbCr and convolution computation is performed on the Y (luminance signal), this is not limiting. For example, the color space can be converted to CIE Lab and convolution computation can be performed on the L (lightness), and, without conversion of the color space, convolution computation can be directly performed on RGB. Moreover, recovery processing can be performed by using not convolution computation but, for example, fast Fourier transform. In that case, after conversion to a frequency space is performed by using fast Fourier transform, integration processing is performed and, then, inverse fast Fourier transform is performed.

Furthermore, while, in the present exemplary embodiment, the halftone processing unit 106 uses a variance value as an index indicating the edge intensity of a processing target block for contrast enhancement, this is not limiting, but, for example, a standard deviation value or a gradient value can be used. Moreover, the size of a local region serving as a unit of processing by the halftone processing unit 106 or the adjustment parameter k does not need to be provided with respective specific values for all of the color materials, but can be provided with the same value. Additionally, a unit of processing by the halftone processing unit 106 does not necessarily need to be a square-shaped rectangular region. For example, the unit of processing can be in a rectangle shape in consideration of anisotropy of the frequency characteristic of a printer. Furthermore, processing by the halftone processing unit 106 does not need to be performed on all of the pieces of color material amount data in the same way. For example, the above-described halftone processing can be performed on some pieces of color material amount data, such as those for visually conspicuous colors, and ordinary dither processing or evaluation value calculation processing of high-density pixels similar to that of low-density pixels can be performed on pieces of color material amount data for the other colors.

Figure 10:
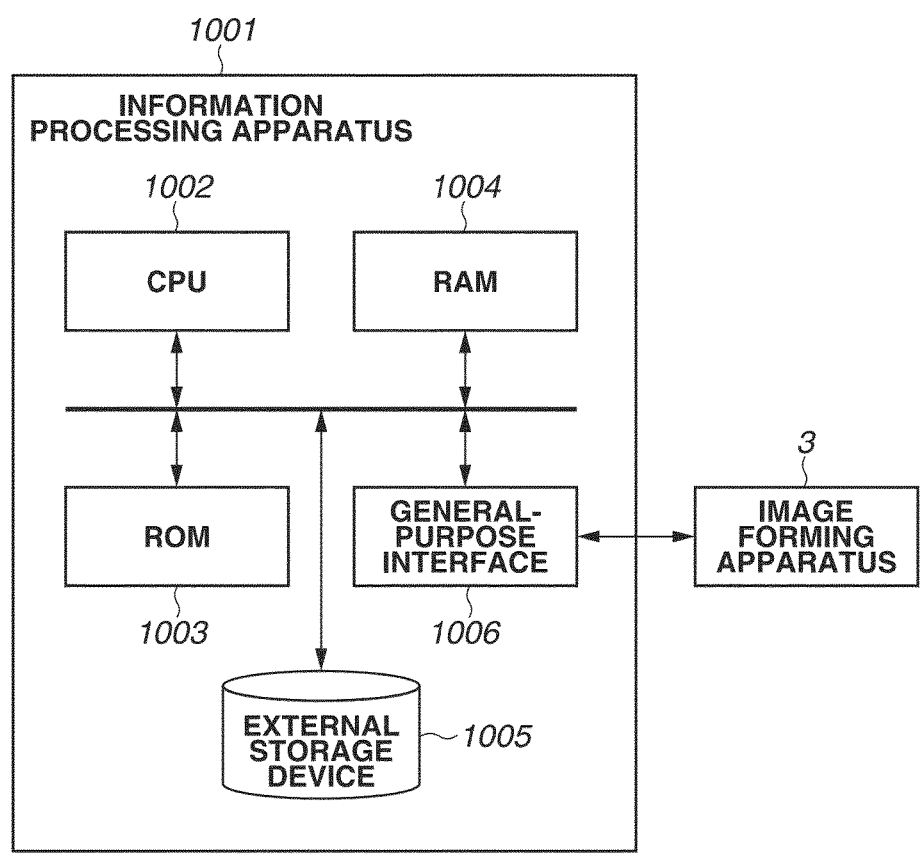
FIG. 10 is a block diagram illustrating a configuration of an information processing apparatus according to one or more aspects of the present disclosure.

In the first exemplary embodiment, a case in which the image processing apparatus 1 is implemented as a dedicated image processing circuit incorporated in the image forming apparatus 3 has been described as an example. However, the image processing apparatus 1 can be implemented by other than a circuit configuration incorporated in the image forming apparatus 3. For example, the image processing apparatus 1 can be implemented by software (computer program) in an information processing apparatus which is independent from the image forming apparatus 3. FIG. 10 is a block diagram illustrating a configuration example of an information processing apparatus 1001. The information processing apparatus 1001 is, for example, a personal computer connected to the image forming apparatus 3 via a general-purpose interface 1006. In this case, the image processing apparatus 1 serves as a driver exclusively used for the image forming apparatus 3, which is installed on the information processing apparatus 1001.

The information processing apparatus 1001 includes a central processing unit (CPU) 1002, a read-only memory (ROM) 1003, a random access memory (RAM) 1004, an external storage device 1005, and the general-purpose interface 1006. The CPU 1002, which may include one or more processors and one or more memories, controls the operation of the entire image forming system using input data and a computer program stored in the RAM 1003 or the ROM 1004, which is described below. Furthermore, while, here, a case in which the CPU 1002 controls the entire information processing apparatus 1001 is described as an example, a plurality of pieces of hardware can share processing to control the entire information processing apparatus 1001. The RAM 1004 has a storage region to temporarily store a computer program or data read from the external storage device 1005 and data received from an external apparatus via the general-purpose interface 1006, which is described below. Moreover, the RAM 1004 is used as a storage region which the CPU 1002 uses to perform various processing operations or a storage region which the CPU 1002 uses to perform image processing. Thus, the RAM 1004 is able to supply various types of storage regions as appropriate. The ROM 1003 stores, for example, setting parameters used for performing setting of various portions in the information processing apparatus 1001 and a boot program. The external storage device 1005 is a storage device which stores various pieces of data and various pieces of information required for the CPU 1002 to perform various processing operations, and is, for example, a hard disk drive (HDD). The general-purpose interface 1006 is an interface used to communicate with an external apparatus (here, the image forming apparatus 3), and is, for example, a universal serial bus (USB) interface. The image processing apparatus 1 illustrated in FIG. 1A is implemented by software processing executed by the CPU 1002. In this case, various configurations (functions) are implemented by the CPU 1002 reading and executing a program capable of implementing the flow of processing (flowcharts) illustrated in FIGS. 6A and 6B.

Figure 16:
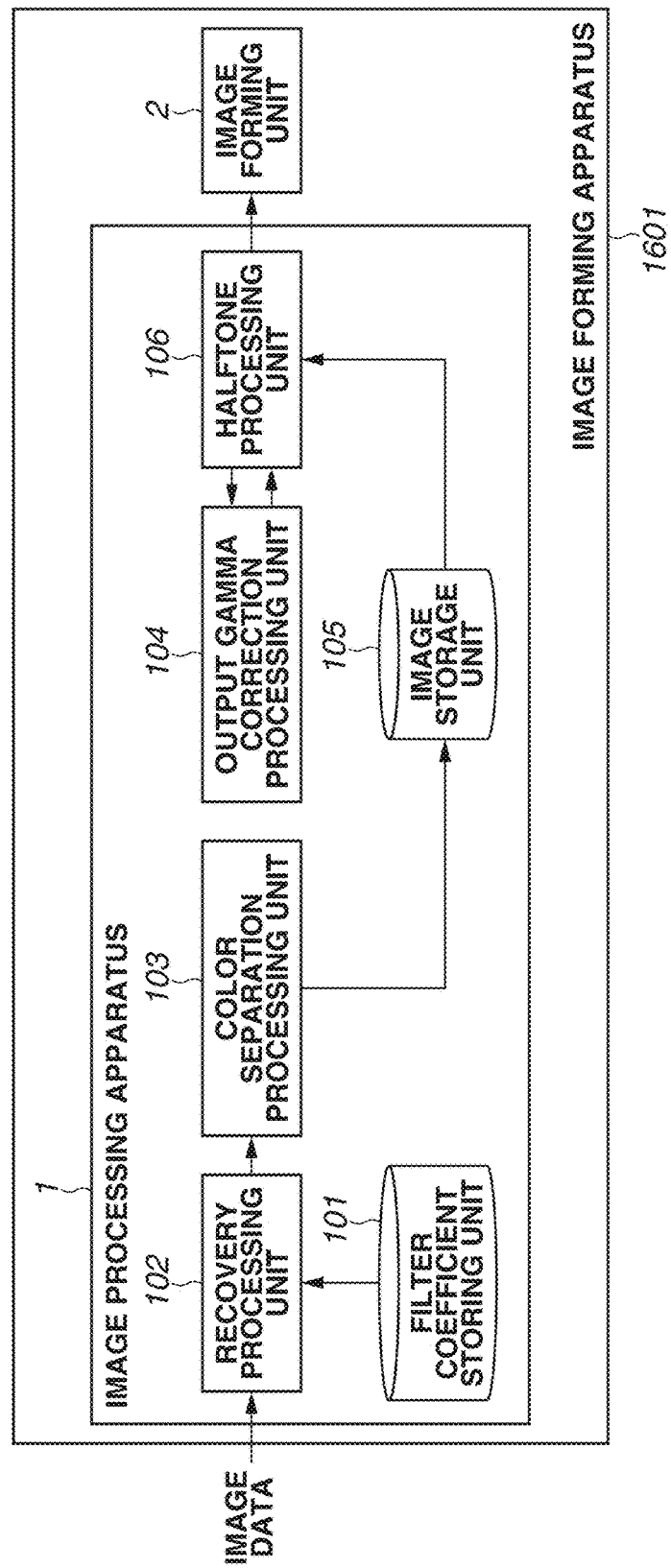
FIG. 16 is a block diagram illustrating a configuration of the image forming apparatus according to one or more aspects of the present disclosure.

In a second exemplary embodiment, gamma correction processing is performed on image data in which color material amount data is averaged for each block, so that more accurate gamma correction processing can be performed. Furthermore, constituent elements similar to those of the first exemplary embodiment are assigned the respective same reference numerals, and the detailed description thereof is not repeated. FIG. 16 is a block diagram illustrating a configuration of an image forming apparatus according to the second exemplary embodiment.

The halftone processing unit 106 reads color material amount data for each color from the image storage unit 105 on a block-by-block basis, and converts the color material amount data into halftone image data. Unlike the first exemplary embodiment, the halftone processing unit 106 reads not data subjected to gamma correction processing by the output gamma correction processing unit 104 but color material amount data acquired from the color separation processing unit 103.

Figure 17:
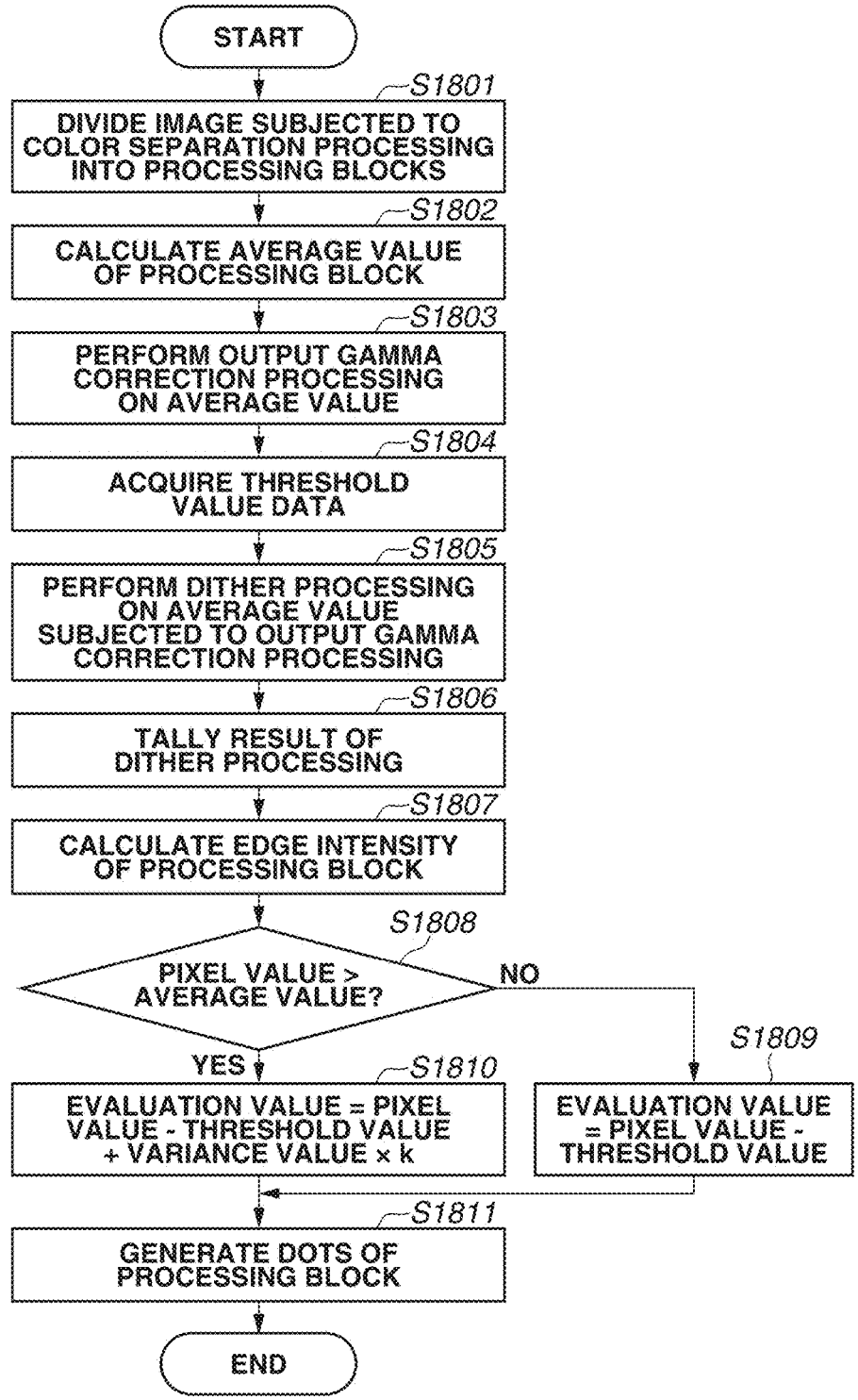
FIG. 17 is a flowchart illustrating the flow of processing performed by the halftone processing unit according to one or more aspects of the present disclosure.

Processing performed by the halftone processing unit 106 in the second exemplary embodiment is described with reference to the flowchart of FIG. 17. Steps S1801 to S1804 and steps S1806 to S1811 are similar to those in the first exemplary embodiment, but processing in step S1805 is different from that in the first exemplary embodiment. In step S1805, the output gamma correction processing unit 104 acquires an average value of the processing target block from the average value calculation unit 108, and performs gamma correction processing on the average value. The target value calculation unit 113 performs dither processing on the average value subjected to gamma correction using the threshold value data acquired in step S1804. The gamma correction processing is processing for correcting input values according to a gamma characteristic which is inverse to the input-output characteristic of the image forming apparatus 3 illustrated in FIG. 2A, to obtain a linear output characteristic. Usually, since the gamma correction processing is designed with the use of solid-color images, in which the pixel value is constant in a predetermined area, appropriate gamma correction is not necessarily performed on images other than the solid-color images. Accordingly, more appropriate gamma correction can be implemented by performing gamma correction processing after averaging rather than performing averaging after gamma correction processing.

Furthermore, the number of times of processing is less in performing gamma correction processing after averaging than in performing gamma correction processing on the pixel value of each pixel. For example, in a case where the block serving as a unit of processing is 4 pixels×4 pixels, the number of times of processing is reduced to $1/16$ as compared with the case of performing gamma correction processing on each pixel.

In the above-described exemplary embodiments, since the edge intensity is calculated on a block-by-block basis, in a case where an edge is present at the block boundary, the edge is not able to be detected. In a third exemplary embodiment, a method for generating halftone processing image data with recovered high-frequency-components, regardless of phases of blocks, by combining results obtained by processing a block, which serves as a unit of processing by the halftone processing unit 106, at a plurality of phases is described.

Figures 18A, 18B:
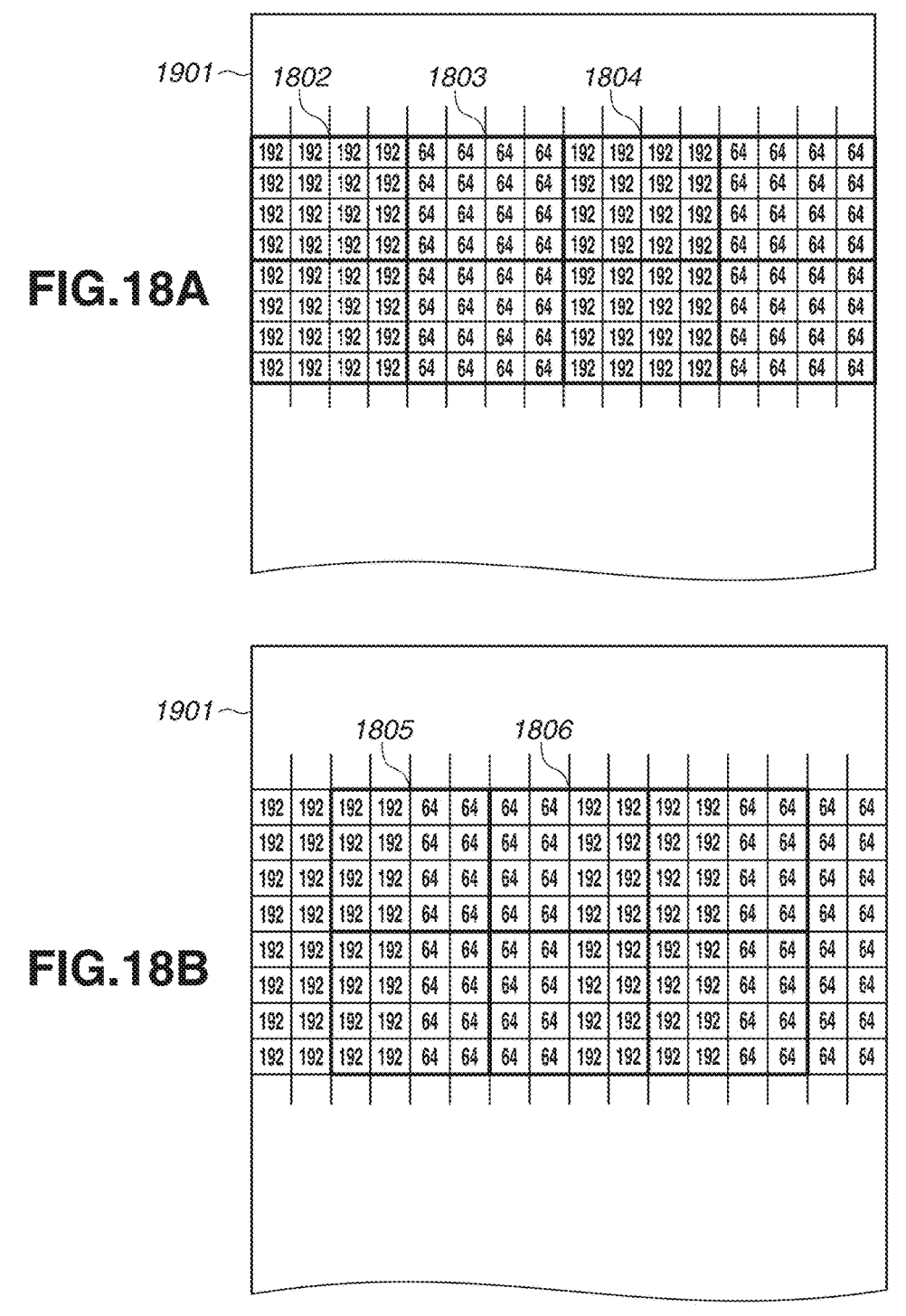

In an image 1901 illustrated in FIG. 18A, the edge is present at intervals of four pixels in the horizontal direction. In such an image, in a case where the block serving as a unit of processing is 4 pixels×4 pixels surrounded by a thick line in FIG. 18A, the boundary of the block coincides with the edge, so that no edge is contained in the block. As a result, despite the presence of edges in the image 1901, the edge intensity of each block is calculated to be low, so that the sharpness in the edge present at the block boundary would be lost. Therefore, in the third exemplary embodiment, after halftone processing is performed with a first dividing process, halftone processing is performed with a second dividing process in which the phase is shifted in such a way as to straddle the block boundary formed by the first dividing process. This causes an edge to be always contained in any processing target block.

Figure 19:
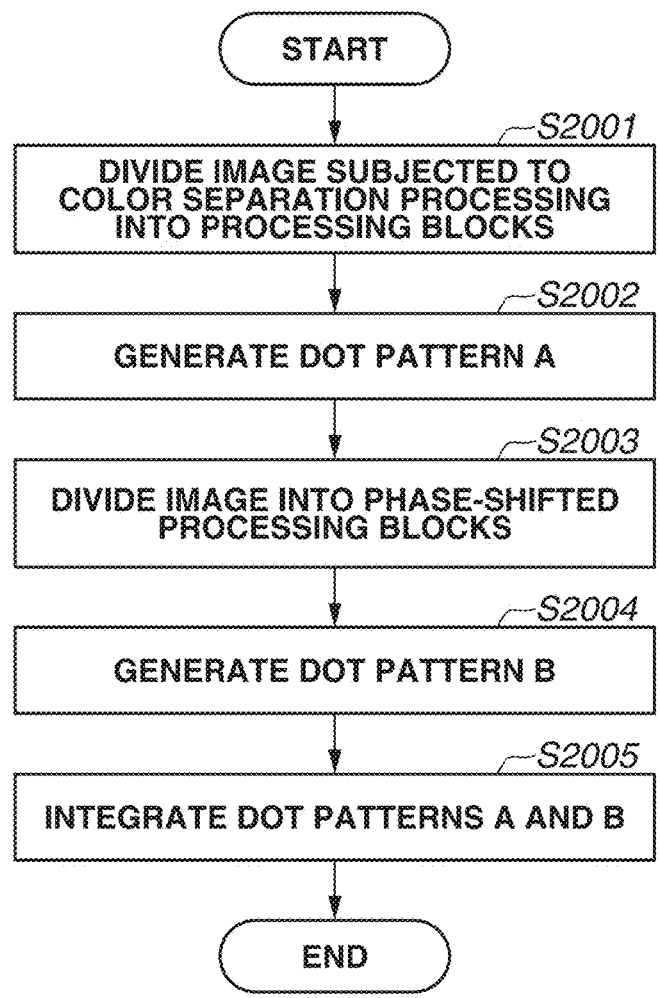
FIG. 19 is a flowchart illustrating the flow of processing performed by the halftone processing unit according to one or more aspects of the present disclosure.
Figure 20:
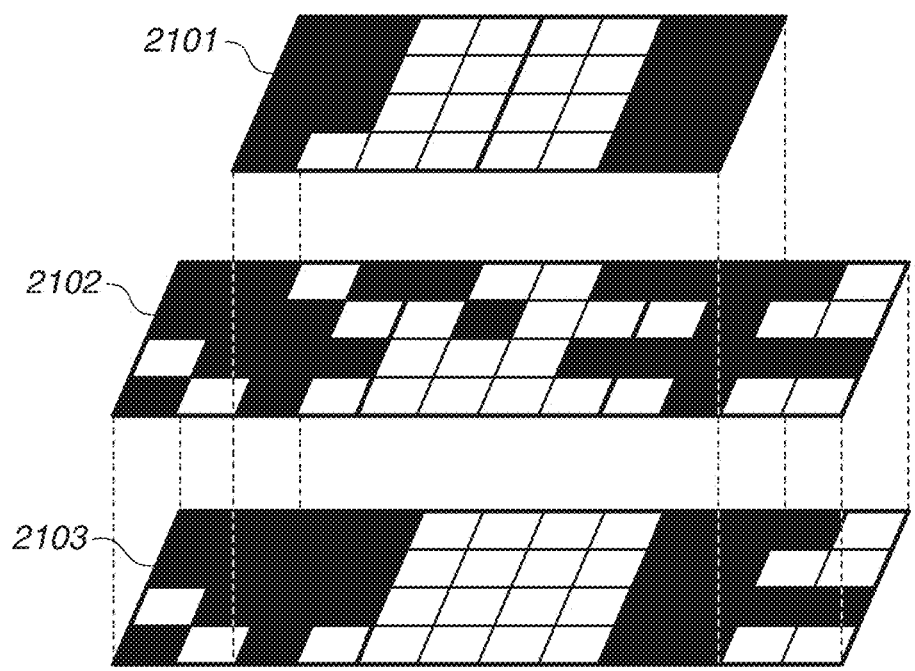
FIG. 20 illustrates a method for synthesizing halftone image data according to one or more aspects of the present disclosure.

Halftone processing performed by the halftone processing unit 106 in the present exemplary embodiment is described with reference to the flowchart of FIG. 19. Here, an example in which a block composed of 4 pixels×4 pixels is used a unit of processing is described. First, in step S2001, a block dividing process is performed in such a manner as illustrated in FIG. 18A, and, in step S2002, the image is converted into halftone image data as in the above-described exemplary embodiments. At this time, a variance value of each block is recorded. For example, in a case where blocks 1802, 1803, and 1804 illustrated in FIG. 18A and threshold value groups 801, 802, and 803 illustrated in FIG. 8A are used in association with each other, the variance value of each block is calculated to be "0", so that halftone image data 2102 illustrated in FIG. 20 is obtained.

Next, in step S2003, the halftone processing unit 106 performs a block dividing process while shifting the phase in such a way as to straddle the block boundary formed in step S2001, as illustrated in FIG. 18B, and, in step S2004, halftone image data is generated in a similar way. In step S2004, a variance value of each block is recorded. For example, in a case where blocks 1805 and 1806 illustrated in FIG. 18B and corresponding threshold value groups 801, 802, and 803 in the threshold value matrix illustrated in FIG. 8A are used in association with each other, the variance value of each block is calculated to be "4096", so that halftone image data 2101 illustrated in FIG. 20 is obtained.

In step S2005, the halftone image data 2101 and the halftone image data 2102 are combined. At this time, with respect to a portion in which blocks overlap each other, dots belonging to a block having a larger variance value are prioritized. In the example illustrated in FIG. 20, when dots are compared between the halftone image data 2101 and the halftone image data 2102, since the blocks of the halftone image data 2101 have a larger variance value than the blocks of the halftone image data 2102, the dots of the halftone image data 2101 are prioritized. As a result, a dot pattern such as halftone image data 2103 is obtained.

Figures 21A, 21B:
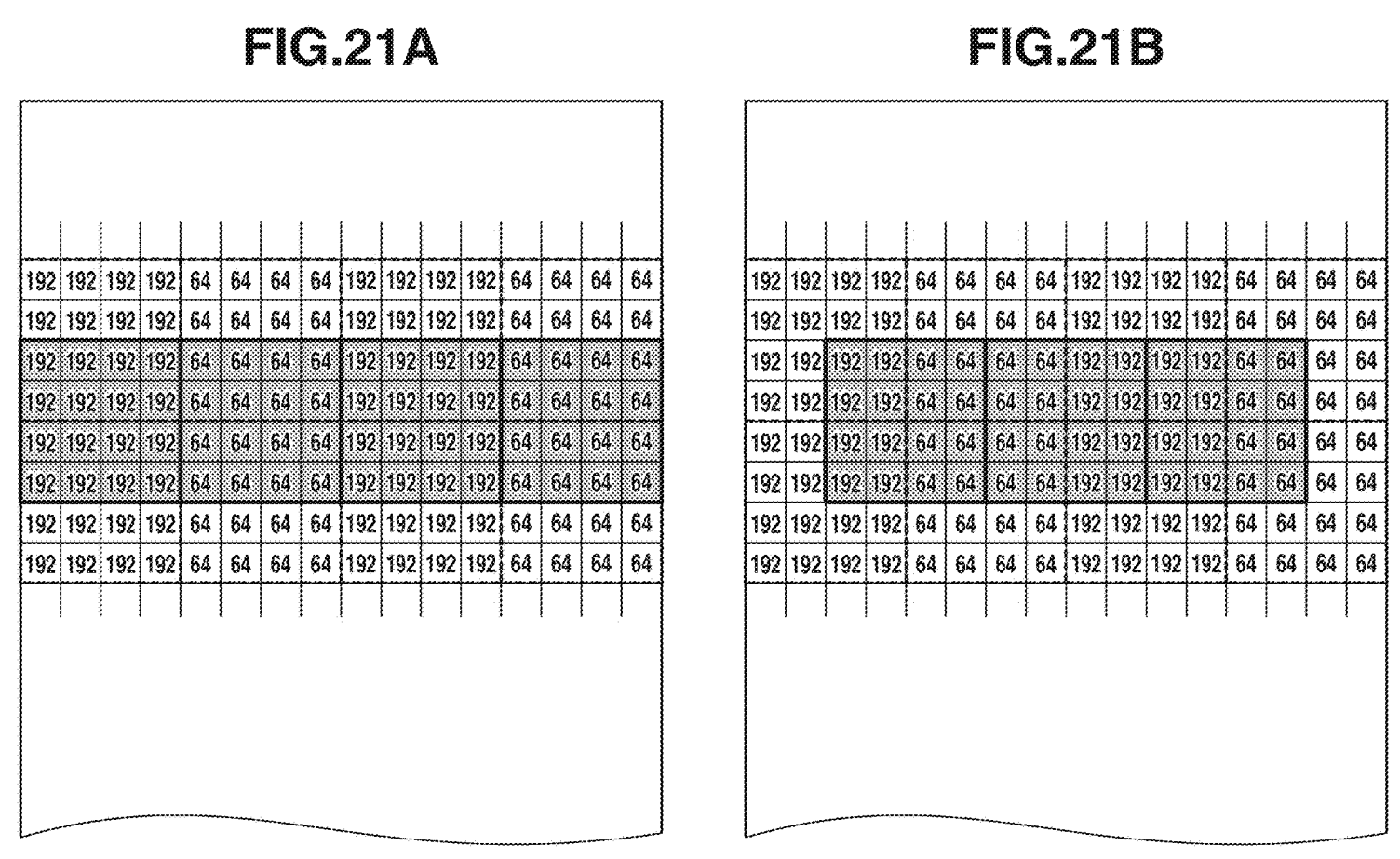

While, in the third exemplary embodiment, a case in which the phase of blocks is shifted in the horizontal direction has been described, dot patterns can be generated while the phase of blocks is shifted in the vertical direction as illustrated in FIG. 21A, and, finally, three dot patterns can be integrated. Alternatively, dot patterns obtained while the phases of blocks are shifted in both the horizontal and vertical directions as illustrated in FIG. 21B can be used.

Furthermore, in a case where a block obtained by division with the phase shifted protrudes from an image, the protruding block can be subjected to no processing, protruding pixels can be deleted for processing, or image data can be extended. Examples of the method for extending image data include filling image data with "0" (white), copying pixel values of the boundary portion of an image to image data, and inverting image data at the boundary portion of an image.

According to the above-described exemplary embodiment, in halftone processing for recovering the sharpness in high-frequency components, the sharpness of an edge can be recovered regardless of the phase of blocks obtained by division.

While, in the above-described exemplary embodiments, an example in which the image forming unit 2 has a configuration provided with color materials of four colors, i.e., cyan (C), magenta (M), yellow (Y), and black (K), has been described, the types of color materials are not limiting. Light ink with a low density, particular color ink, such as red or green ink, or white ink can also be used. Moreover, the image forming unit 2 is not limited to an example of using the inkjet system.

According to exemplary embodiments of the present disclosure, image data in which a decrease in sharpness is compensated for with respect to an input image and, at the same time, the brightness is prevented from decreasing in a high-frequency region can be generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-087442 filed Apr. 25, 2016, which is hereby incorporated by reference herein in its entirety.

What is claimed is:

1. An image processing apparatus for generating halftone image data that is usable by an image forming apparatus which forms an image on a recording medium, the image processing apparatus comprising:
a recovery processing unit configured to perform, on input image data, recovery processing for recovering sharpness of a frequency component lower than a predetermined frequency in image sharpness that is deceased by the image forming apparatus; and
a halftone processing unit configured to convert the image data subjected to the recovery processing by the recovery processing unit into halftone image data with a number of gradation levels which is able to be output by the image forming apparatus,
wherein the halftone processing unit includes:
a target value calculation unit configured to calculate, as a target value, a number of dots that are to be output for each local region of the image data subjected to the recovery processing;
an acquisition unit configured to acquire threshold values corresponding to the local region;
an edge intensity calculation unit configured to calculate edge intensity in the local region;
a division unit configured to divide pixels included in the local region into a first pixel group and a second pixel group based on a pixel value of each pixel;
a distribution order determination unit configured to calculate, with respect to each pixel included in the local region, an evaluation value of each pixel based on a pixel value of each pixel, a threshold value corresponding to each pixel, and the edge intensity and to determine a distribution order, in which dots are to be distributed, based on an order of the evaluation value; and
an output value determination unit configured to determine an output value for each pixel in the local region by distributing dots to pixels included in the local region as much as the target value while referring to the distribution order, and
wherein the distribution order determination unit calculates the evaluation value in such a way that dots are likely to be distributed to the first pixel group and dots are unlikely to be distributed to the second pixel group.

2. The image processing apparatus according to claim 1, wherein the division unit calculates an average value of pixel values of pixels included in the local region, sets pixels having pixel values greater than the average value as the first pixel group, and sets pixels having pixel values equal to or less than the average value as the second pixel group.

3. The image processing apparatus according to claim 2, wherein the distribution order determination unit calculates, with respect to pixels of the second pixel group, a difference between a pixel value of each pixel and a corresponding threshold value as the evaluation value, and calculates, with respect to pixels of the first pixel group, a value obtained by weighting a difference between a pixel value of each pixel and a corresponding threshold value according to the edge intensity.

4. The image processing apparatus according to claim 1, further comprising an average value calculation unit configured to calculate an average value of pixel values of pixels included in the local region,
wherein the target value calculation unit calculates the target value based on the average value and the threshold values.

5. The image processing apparatus according to claim 1, further comprising a gamma correction unit configured to perform gamma correction on the image data subjected to the recovery processing output from the recovery processing unit,
wherein the halftone processing unit sets image data output from the gamma correction unit as a processing target.

6. The image processing apparatus according to claim 1, further comprising:
an average value calculation unit configured to calculate an average value of pixel values of pixels included in the local region; and
a gamma correction unit configured to perform gamma correction on the average value,
wherein the target value calculation unit calculates the target value based on the average value subjected to the gamma correction by the gamma correction unit.

7. The image processing apparatus according to claim 1, wherein the edge intensity calculation unit calculates a variance value of pixel values of pixels included in the local region as the edge intensity.

8. The image processing apparatus according to claim 1, wherein the halftone processing unit generates first halftone image data by performing halftone processing on each block obtained by block division at a first phase,
generates second halftone image data by performing halftone processing on each block obtained by block division at a second phase different from the first phase, and
generates halftone image data by combining the first halftone image data and the second halftone image data.

9. An image processing method for generating halftone image data that is usable by an image forming apparatus which forms an image on a recording medium, the image processing method comprising:
performing, on input image data, recovery processing for recovering sharpness of a frequency component lower than a predetermined frequency in image sharpness that is deceased by the image forming apparatus;
calculating, as a target value, a number of dots that are to be output for each local region of the image data subjected to the recovery processing;
acquiring threshold values corresponding to the local region;
calculating edge intensity in the local region;
dividing pixels included in the local region into a first pixel group and a second pixel group based on a pixel value of each pixel;
calculating, with respect to each pixel included in the local region, an evaluation value of each pixel based on a pixel value of each pixel, a threshold value corresponding to each pixel, and the edge intensity in such a way that dots are likely to be distributed to the first pixel group and dots are unlikely to be distributed to the second pixel group, and determining a distribution order, in which dots are to be distributed, based on an order of the evaluation value; and
determining an output value for each pixel in the local region by distributing dots to pixels included in the local region as much as the target value while referring to the distribution order, thus generating the halftone image data.

10. A non-transitory computer-readable storage medium storing instructions that, when executed by a computer, cause the computer to perform a method comprising:
- performing, on input image data, recovery processing for recovering sharpness of a frequency component lower than a predetermined frequency in image sharpness that is deceased by the image forming apparatus;
- calculating, as a target value, a number of dots that are to be output for each local region of the image data subjected to the recovery processing;
- acquiring threshold values corresponding to the local region;
- calculating edge intensity in the local region;
- dividing pixels included in the local region into a first pixel group and a second pixel group based on a pixel value of each pixel;
- calculating, with respect to each pixel included in the local region, an evaluation value of each pixel based on a pixel value of each pixel, a threshold value corresponding to each pixel, and the edge intensity in such a way that dots are likely to be distributed to the first pixel group and dots are unlikely to be distributed to the second pixel group, and determining a distribution order, in which dots are to be distributed, based on an order of the evaluation value; and
- determining an output value for each pixel in the local region by distributing dots to pixels included in the local region as much as the target value while referring to the distribution order, thus generating the halftone image data.

* * * * *